US010738827B2

(12) United States Patent
Unno et al.

(10) Patent No.: US 10,738,827 B2
(45) Date of Patent: Aug. 11, 2020

(54) MANAGEMENT SYSTEM AND MOTION GUIDANCE DEVICE

(71) Applicant: THK CO., LTD., Tokyo (JP)

(72) Inventors: Akihiro Unno, Tokyo (JP); Yuki Hayashi, Tokyo (JP); Yuki Tanaka, Tokyo (JP); Tomofumi Ohashi, Tokyo (JP); Yusuke Asano, Tokyo (JP); Katsunori Kogure, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/474,261

(22) PCT Filed: Dec. 21, 2017

(86) PCT No.: PCT/JP2017/045916
§ 371 (c)(1),
(2) Date: Jun. 27, 2019

(87) PCT Pub. No.: WO2018/123803
PCT Pub. Date: Jul. 5, 2018

(65) Prior Publication Data
US 2020/0124091 A1 Apr. 23, 2020

(30) Foreign Application Priority Data

Dec. 28, 2016 (JP) ................................ 2016-256587

(51) Int. Cl.
*F16C 29/06* (2006.01)
*F16C 29/04* (2006.01)

(52) U.S. Cl.
CPC ........ *F16C 29/046* (2013.01); *F16C 2233/00* (2013.01); *F16C 2237/00* (2013.01)

(58) Field of Classification Search
CPC .... F16C 29/06; F16C 26/0614; F16C 29/063; F16C 29/0633; F16C 29/0635;
(Continued)

(56) References Cited

U.S. PATENT DOCUMENTS

| 6,174,084 B1* | 1/2001 | Pauwels | ................. | F16C 29/00 |
| | | | | 384/43 |
| 6,854,351 B2* | 2/2005 | Yabe | ...................... | F16C 19/20 |
| | | | | 384/45 |

(Continued)

FOREIGN PATENT DOCUMENTS

JP 4236022 B2 3/2009

OTHER PUBLICATIONS

International Search Report dated Jan. 23, 2018, issued in counterpart International Application No. PCT/JP2017/045916, with English Translation (2 pages).

*Primary Examiner* — Phillip A Johnson
(74) *Attorney, Agent, or Firm* — Westerman, Hattori, Daniels & Adrian, LLP

(57) ABSTRACT

In a management system which manages user equipment installed in a prescribed space managed by a user, the user equipment including a plurality of motion guidance devices each including a track member, a moving member, and a plurality of displacement sensors which detect displacements of the moving member in a prescribed number of displacement directions in the moving member, on the basis of lifespan-related information corresponding to each of the plurality of motion guidance devices, a lifespan exhaustion ratio of each motion guidance device is calculated and, on the basis of the calculated lifespan exhaustion ratio, replacement object devices to be replaced within a prescribed period which constitute a part of or all of the plurality of motion guidance devices are determined. In addition, a user is notified of a replacement timing at which all of the determined replacement object devices in the user equipment are to be replaced.

8 Claims, 18 Drawing Sheets

(58) Field of Classification Search
CPC ............... F16C 29/0638; F16C 29/064; F16C 29/0642; F16C 29/0645; F16C 29/065; F16C 29/0652; F16C 29/0654; F16C 29/0657; F16C 29/0659; F16C 29/0661; F16C 29/0664; F16C 29/0666; F16C 29/0671; F16C 29/0673; F16C 29/1678; F16C 29/068; F16C 29/0683; F16C 29/0685; F16C 29/0688; F16C 29/069; F16C 2233/00; F16C 2237/00; G01M 13/04; G01M 13/045
See application file for complete search history.

(56) References Cited

U.S. PATENT DOCUMENTS

| | | | |
|---|---|---|---|
| 7,546,211 B2* | 6/2009 | Yoshioka | F16C 29/00 384/8 |
| 7,555,953 B2* | 7/2009 | Yoshioka | F16C 29/00 73/587 |
| 9,188,164 B2* | 11/2015 | Huag | F16H 25/2214 |
| 2002/0013635 A1 | 1/2002 | Gotou et al. | |
| 2018/0264614 A1* | 9/2018 | Winkelmann | B23Q 17/0966 |

* cited by examiner

[Fig. 1]
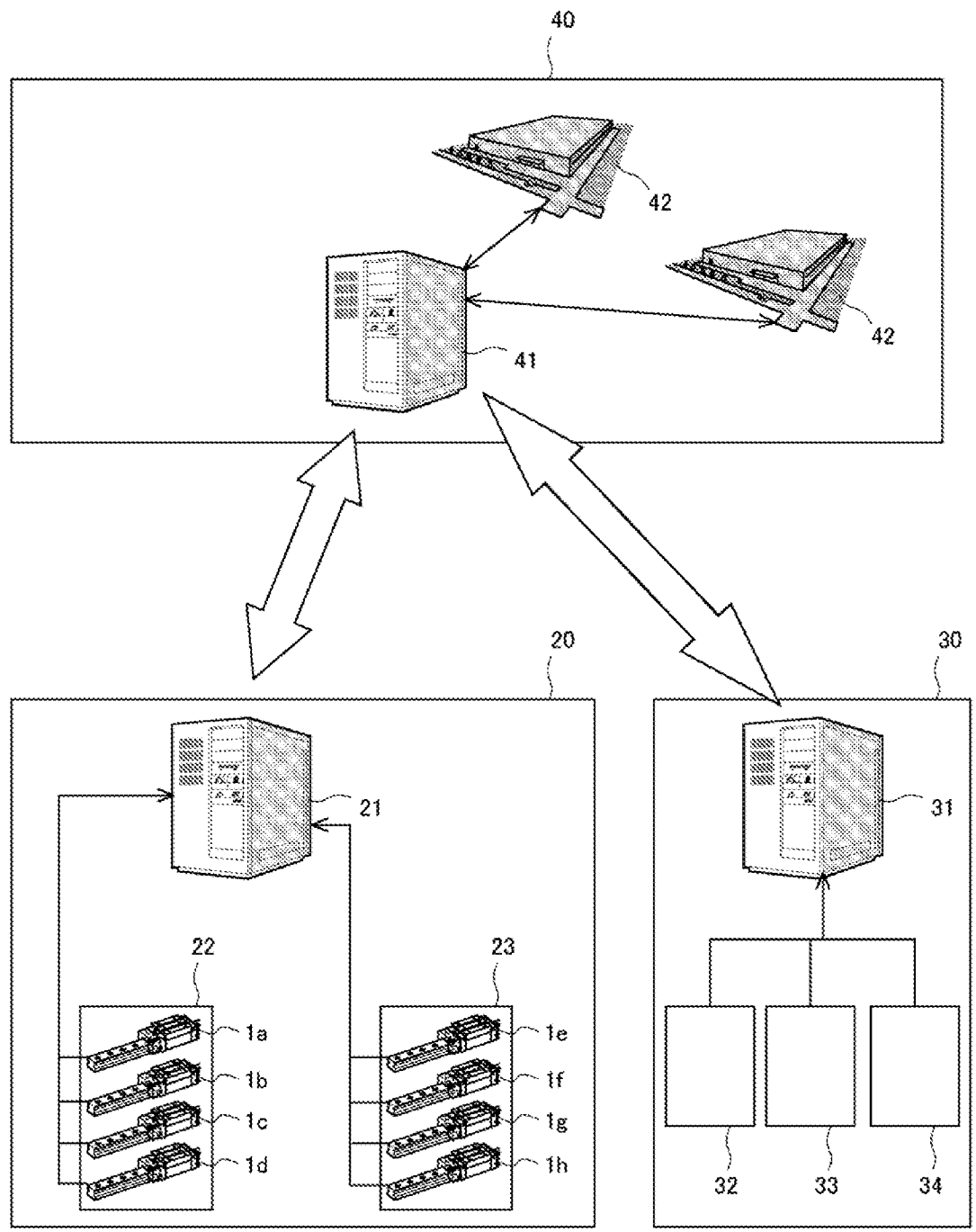

[Fig. 2]
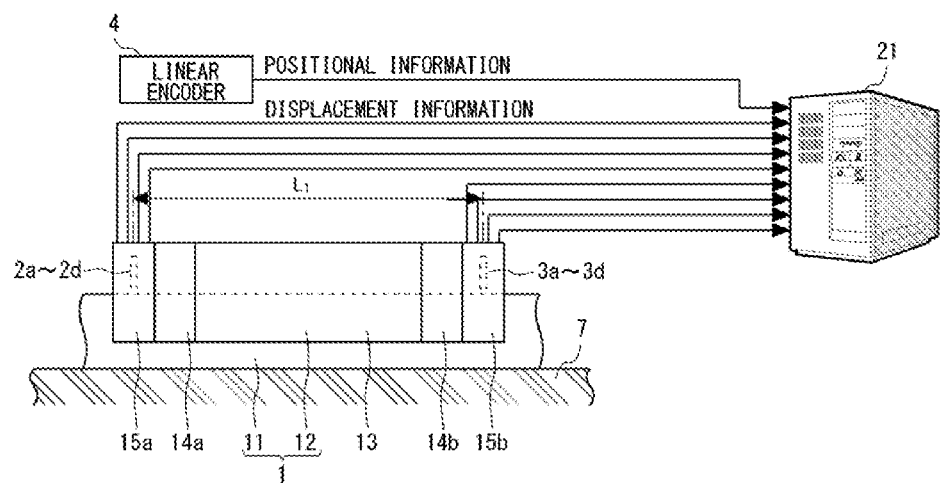

[Fig. 3]
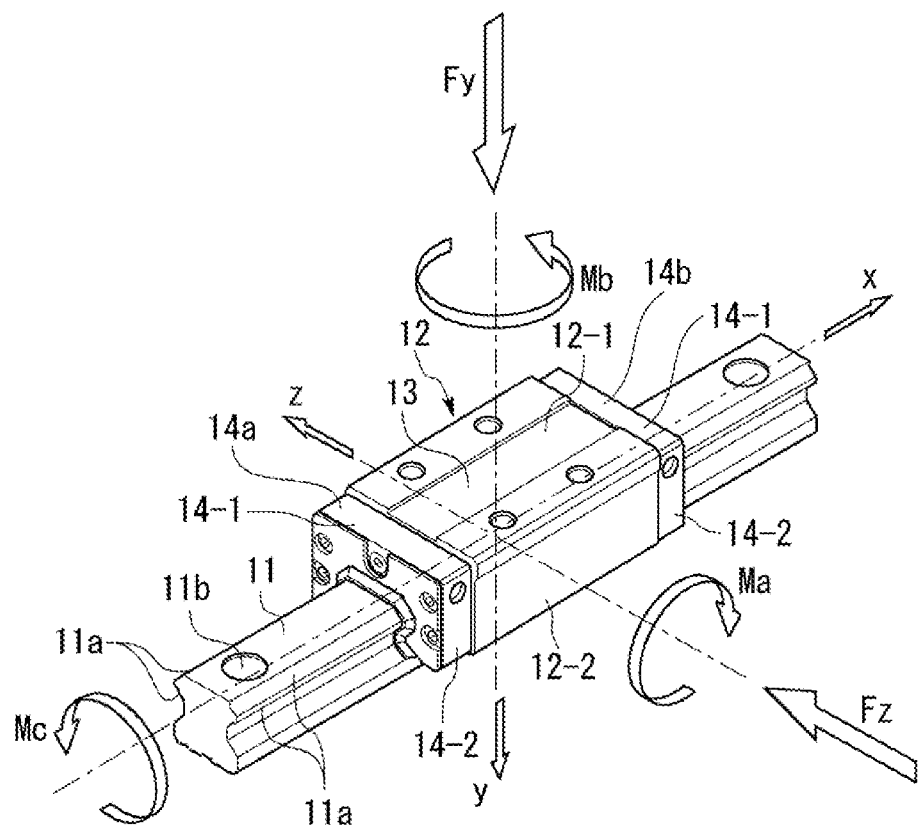

[Fig. 4]
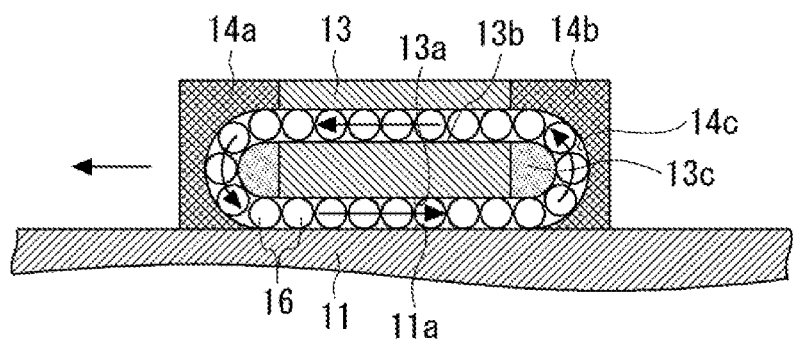

[Fig. 5]
Fig. 5 ( a )
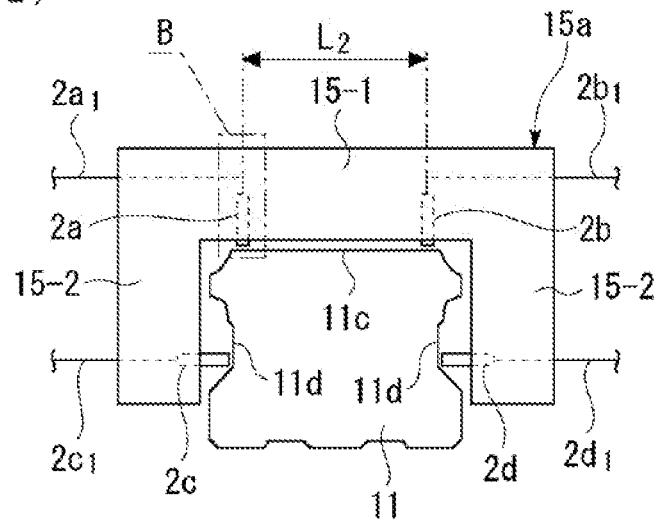
Fig. 5 ( b )
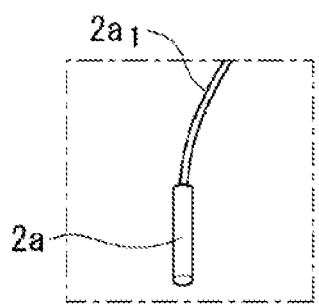
ENLARGED VIEW OF PART B

[Fig. 6]
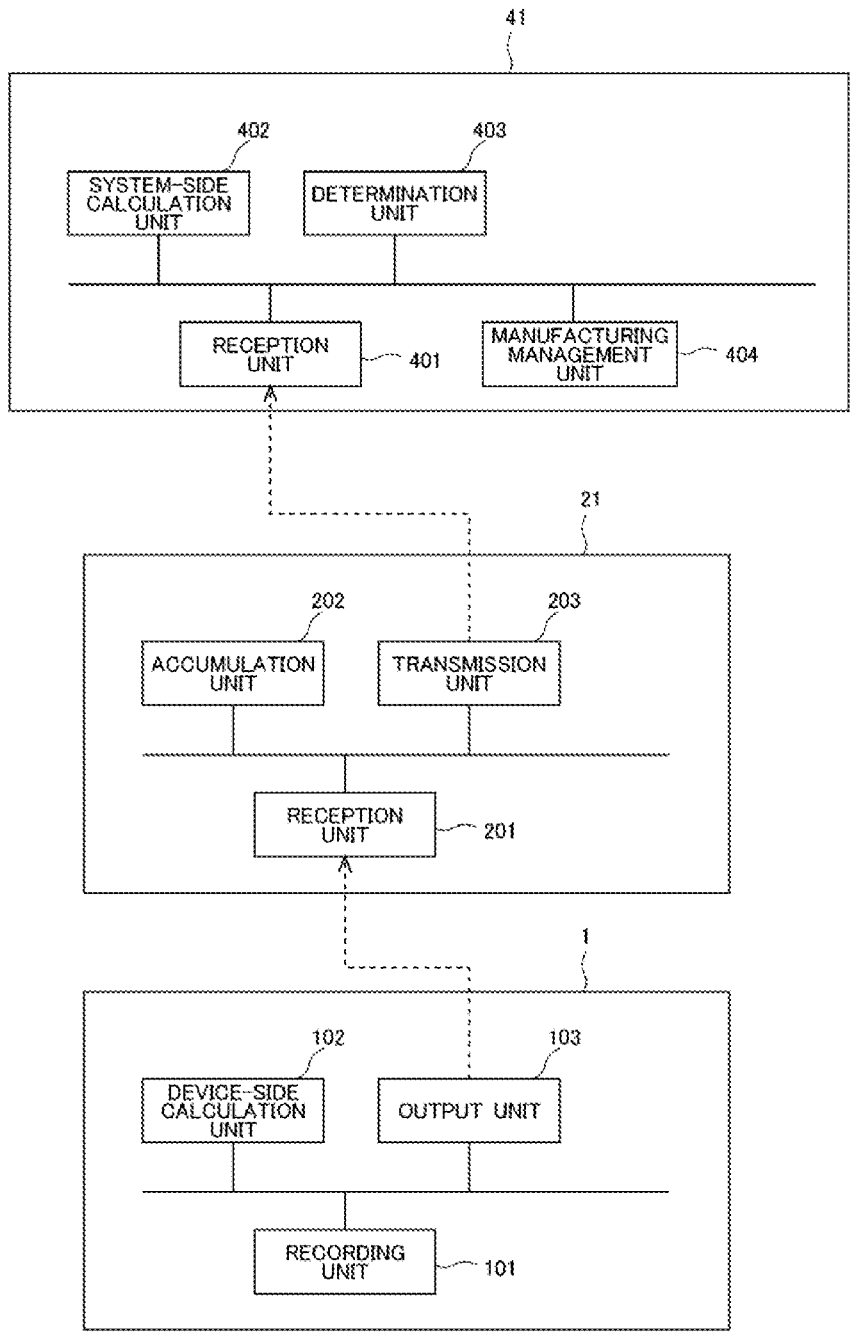

[Fig. 7]
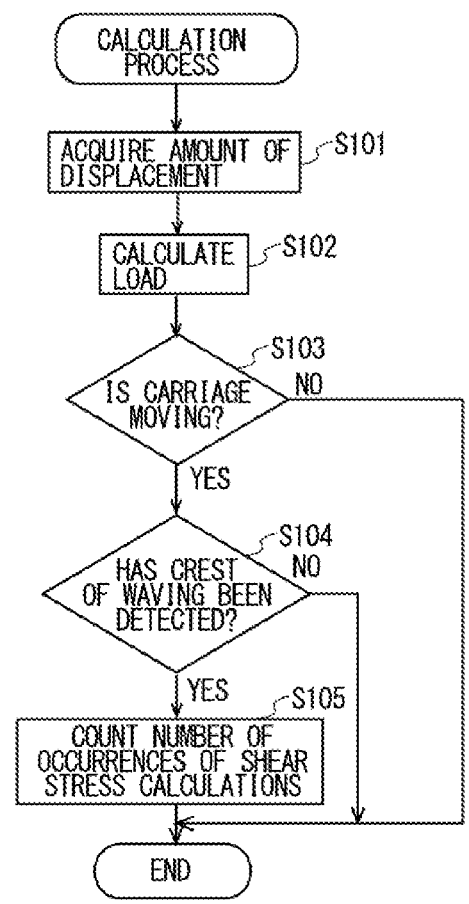

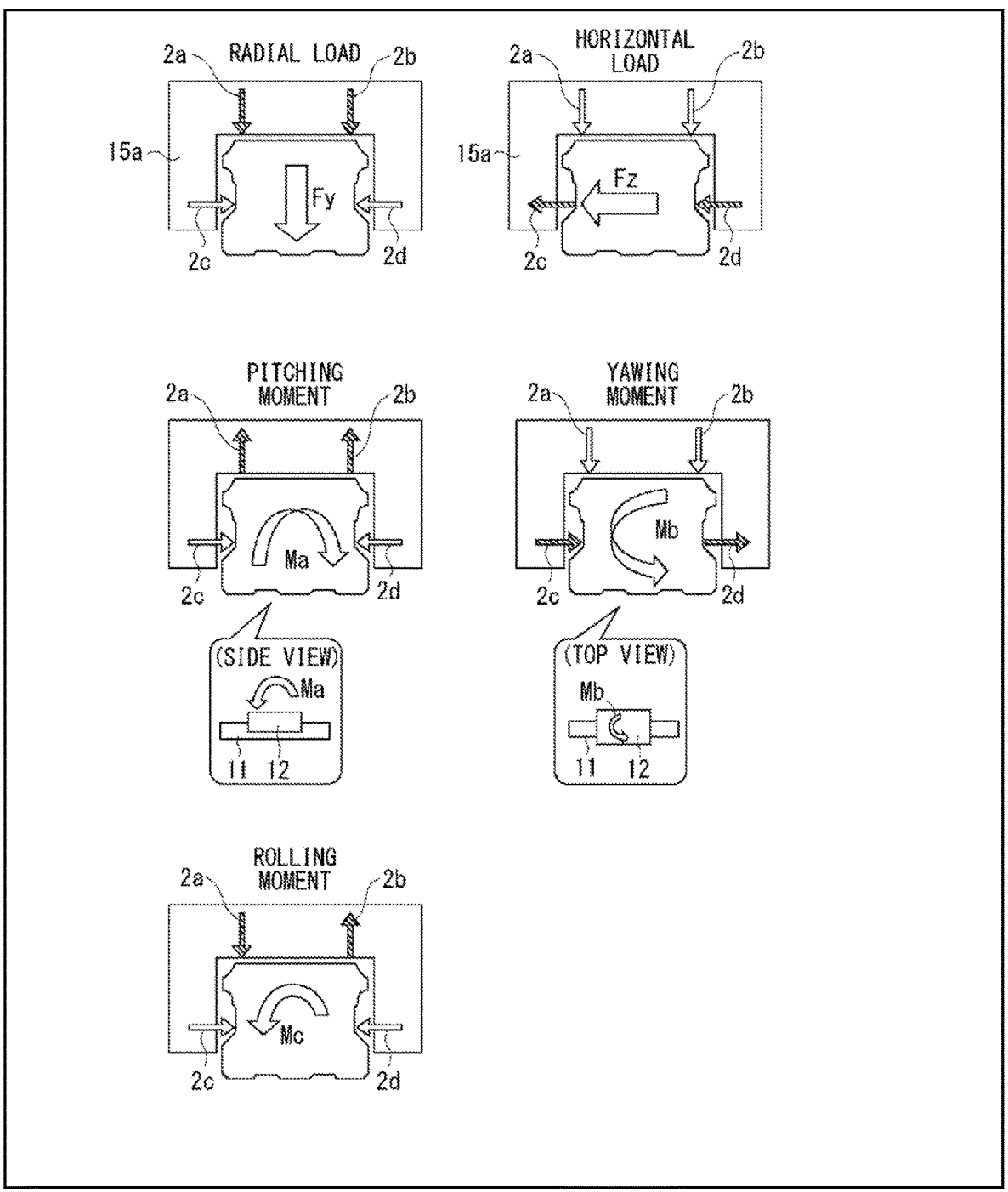

[Fig. 9]
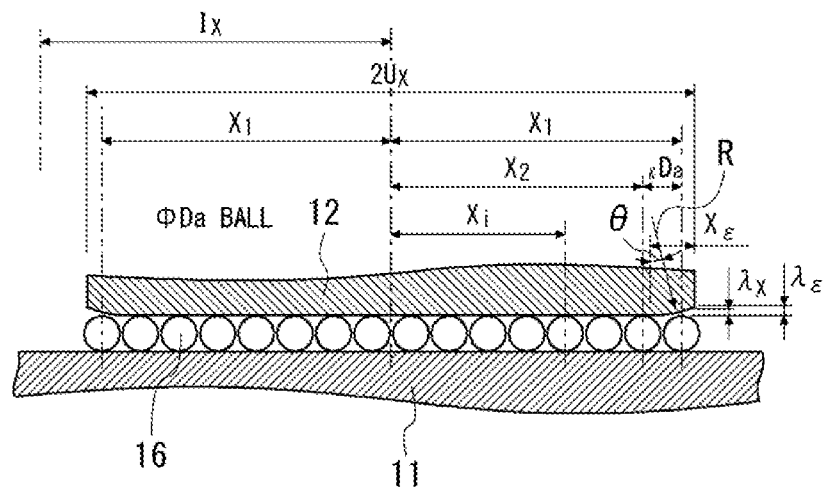

[Fig. 10]
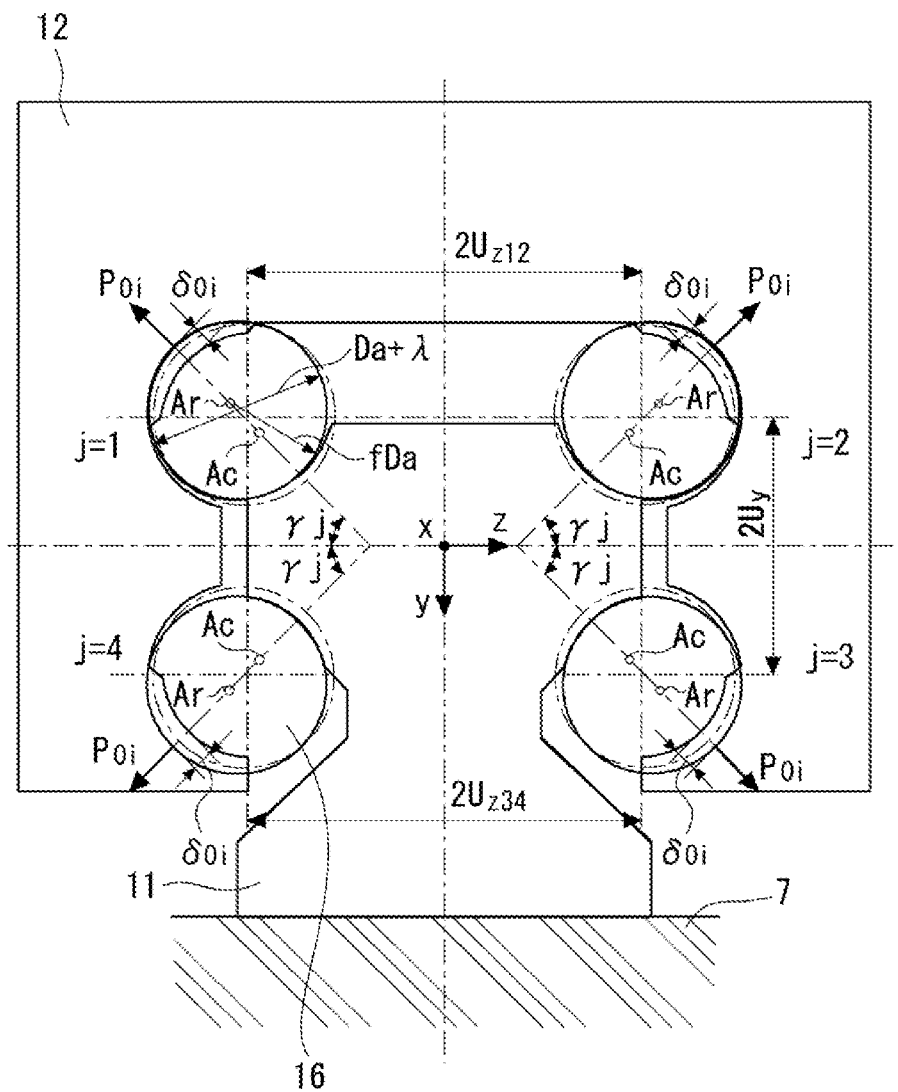

[Fig. 11]
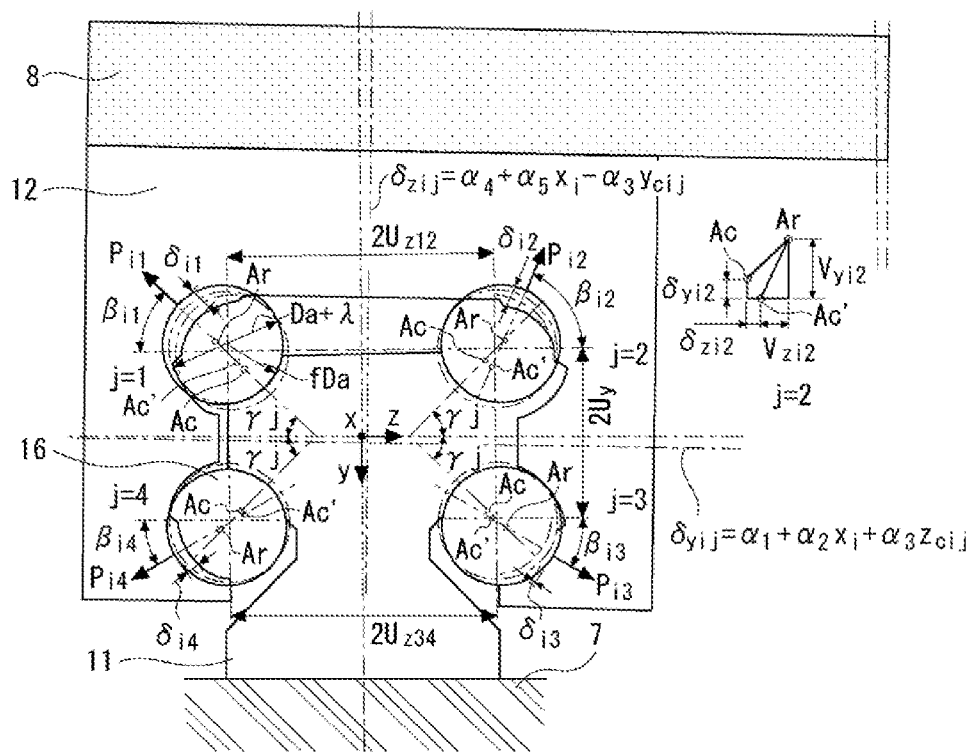

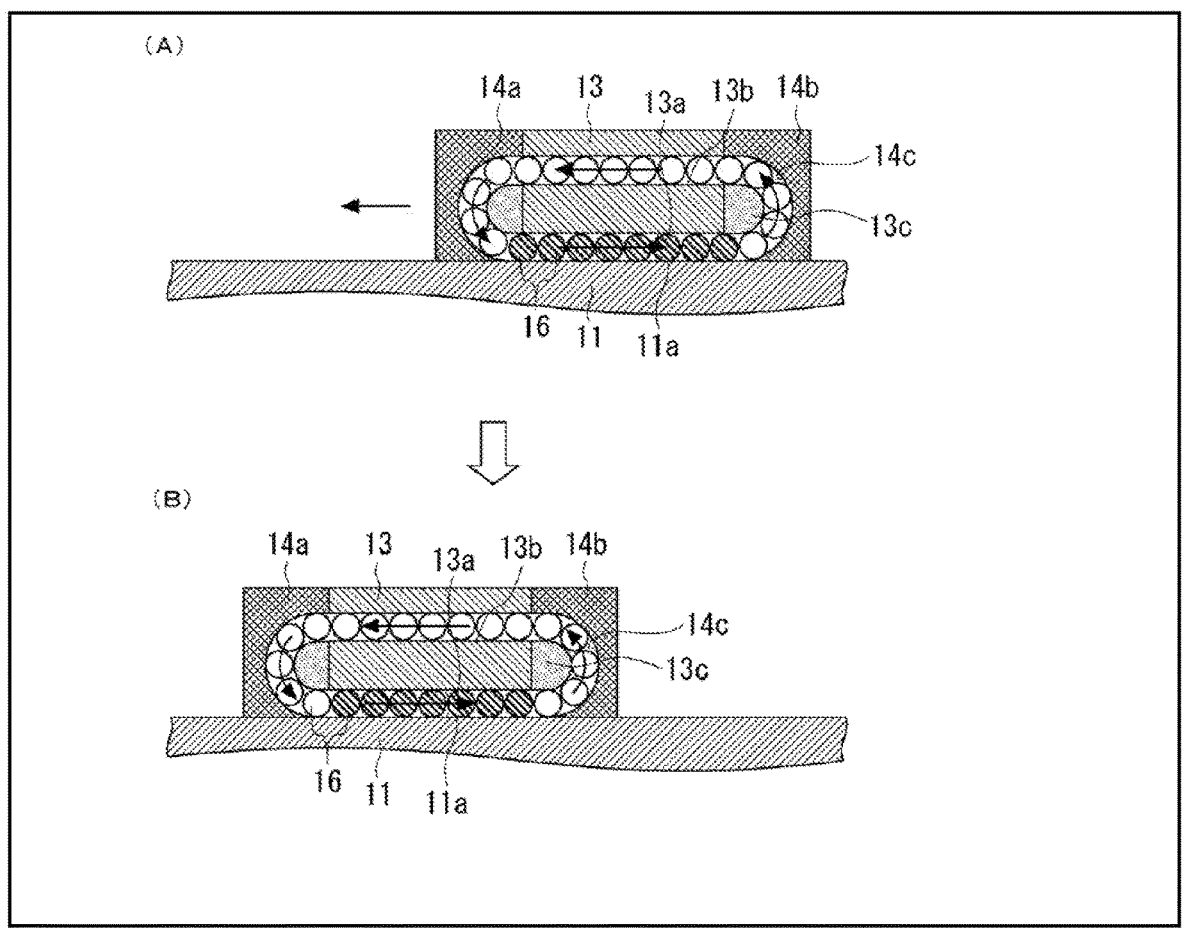
[Fig. 12]

[Fig. 13]
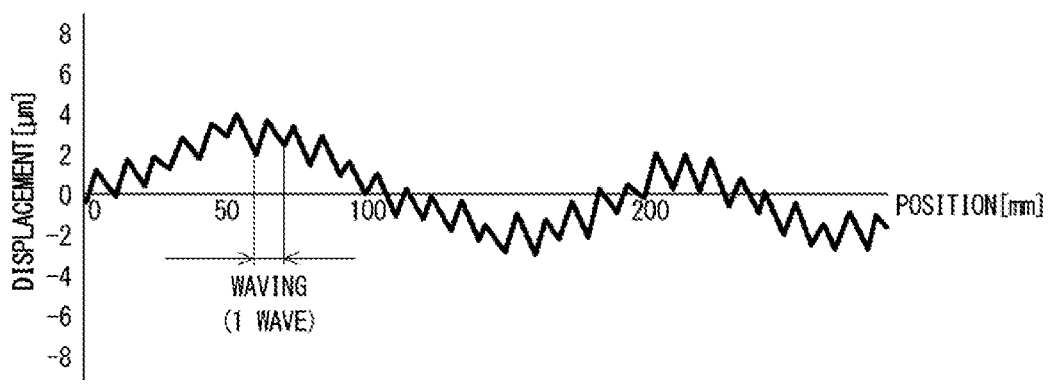

[Fig. 14]
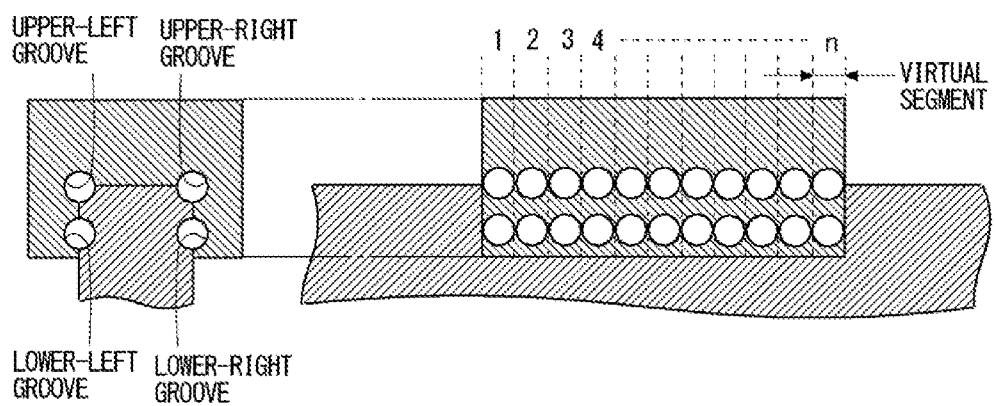

[Fig. 15]
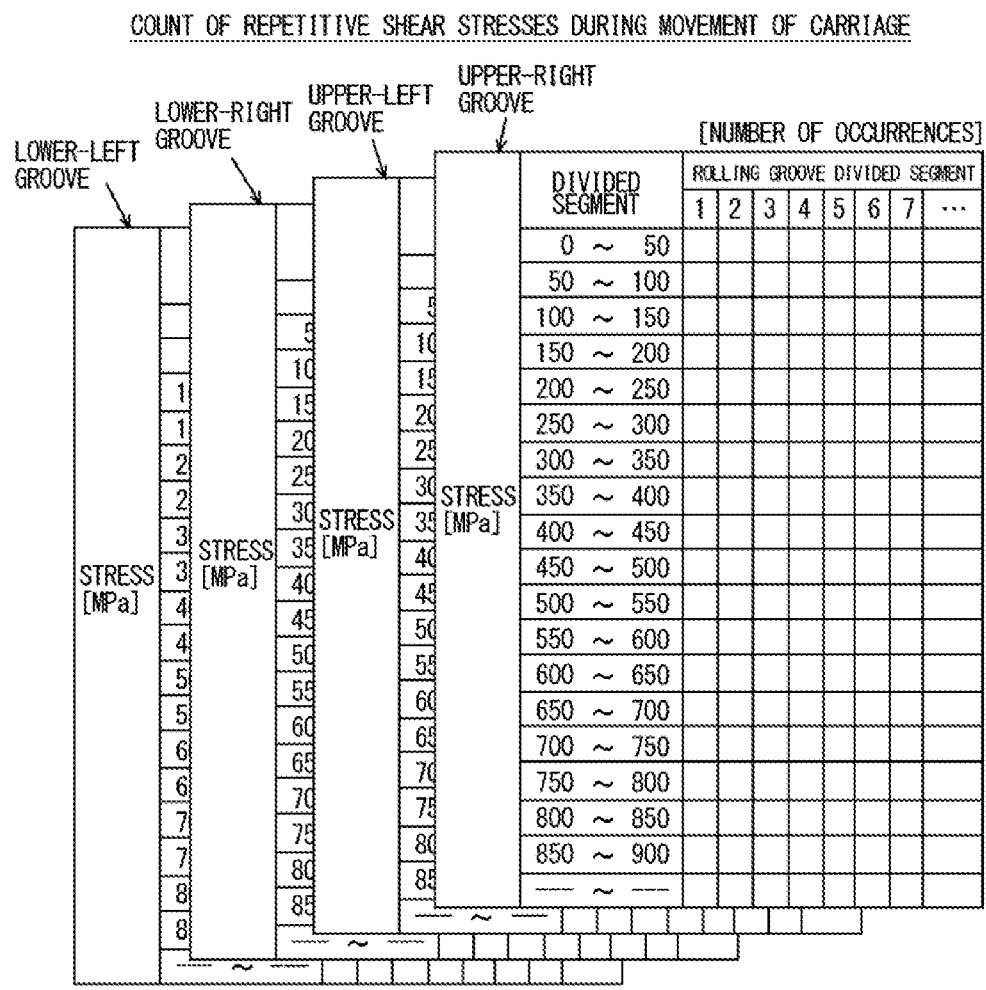

[Fig. 16]
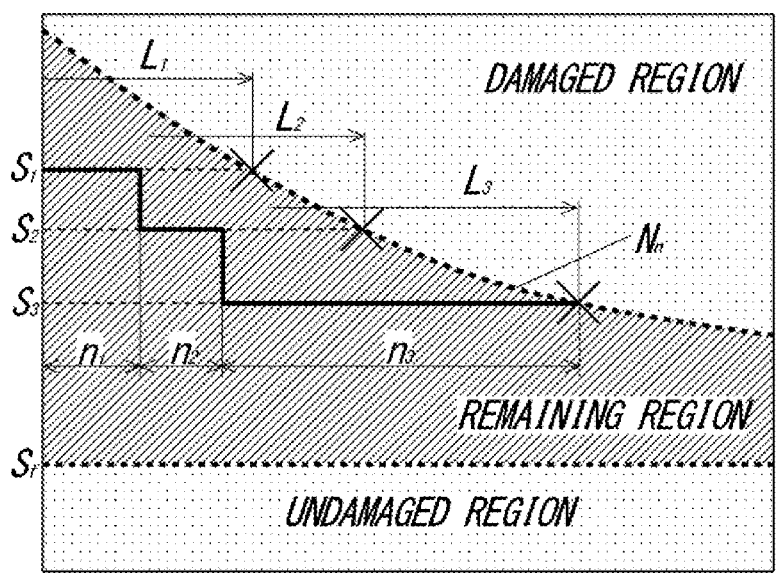

[Fig. 17]
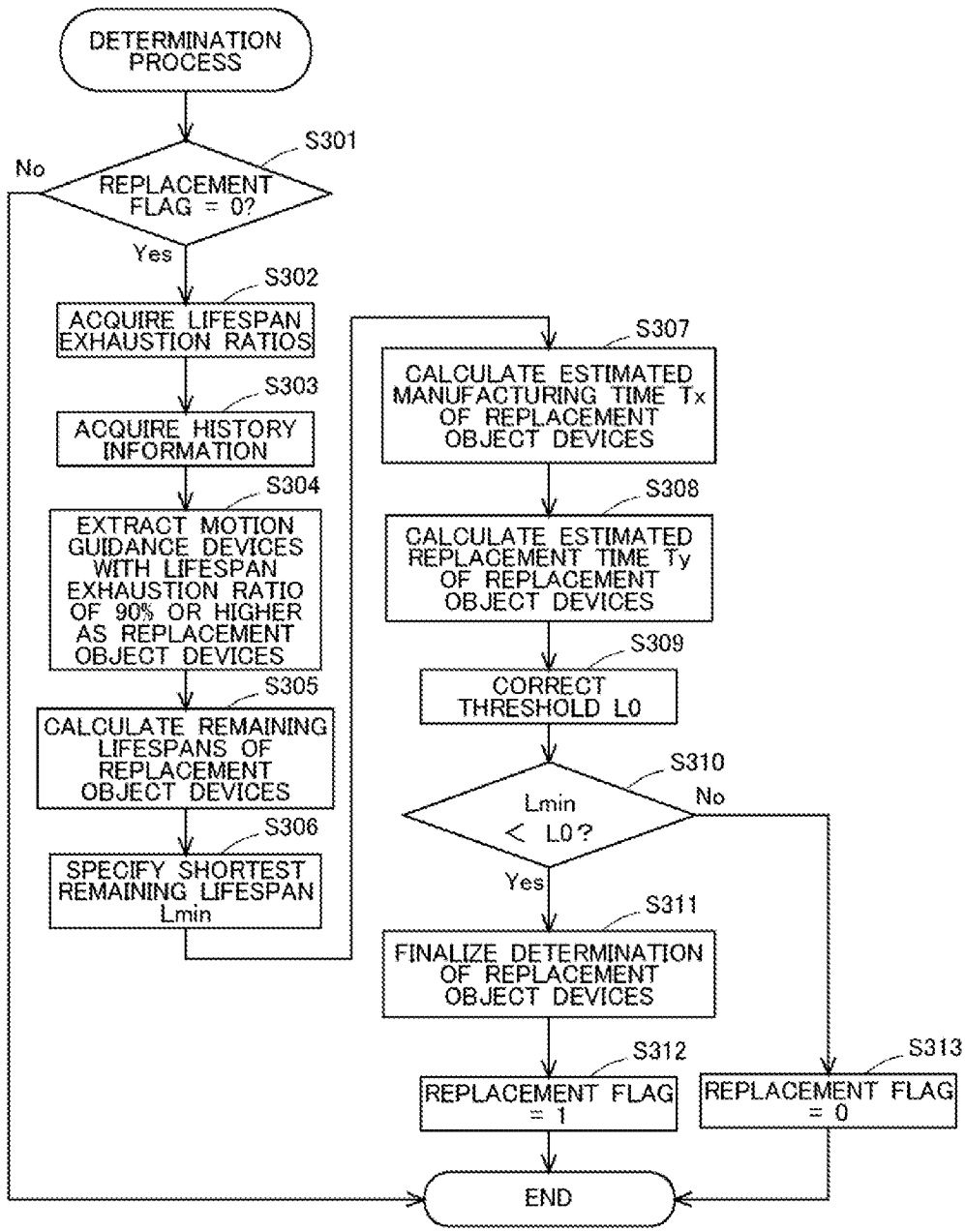

[Fig. 18]
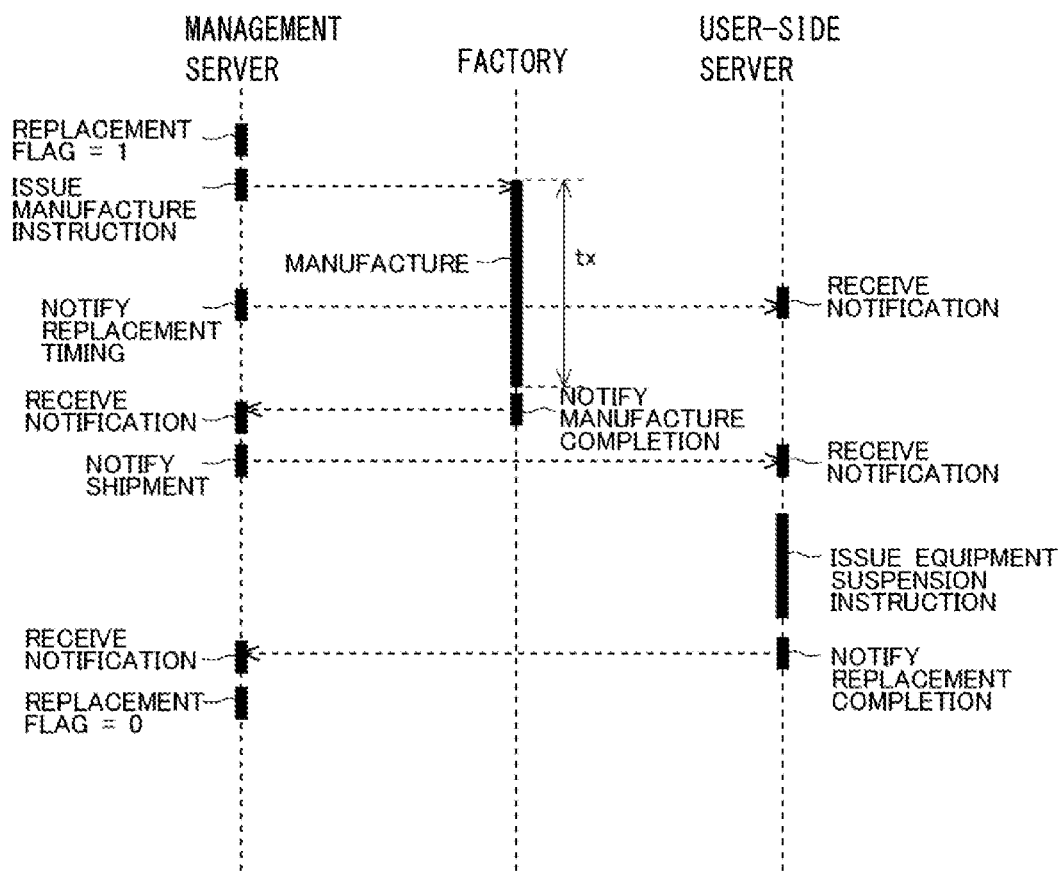

MANAGEMENT SYSTEM AND MOTION GUIDANCE DEVICE

TECHNICAL FIELD

The present invention relates to a system for managing user equipment including a plurality of motion guidance devices each including a track member and a moving member and to a motion guidance device mounted to the managed user equipment.

BACKGROUND ART

Generally, a large number of supporting devices for supporting movable portions are used in various apparatuses including robots, machine tools, and semiconductor/liquid crystal manufacturing apparatuses. For example, when a movable part is a rotationally driven shaft, a bearing that rotatably supports the movable shaft is used, and when a movable part is linearly driven, a motion guidance device that supports the movable part so as to enable linear motion is used. Since supporting devices used in such movable parts are subjected to various loads as the movable parts are driven, the supporting devices have a period in which a suitable operating state is continuously maintainable or, more simply, a lifespan period. In other words, substantial operations of various apparatuses are limited by the lifespan periods of movable parts.

PTL 1 discloses a technique related to a system which diagnoses conditions of used bearings and manages an inventory of replacement bearings at a customer company that uses a large number of bearings and which performs manufacturing management at a company that produces and sells the bearings. According to the technique, a plurality of sensors for detecting vibration and temperature are provided on a machine part such as bearings being assembled to a machine in the customer company, and detected values of the plurality of sensors are used to perform a determination process with respect to a use state or a remaining usable period (lifespan) of the machine part. Subsequently, on the basis of a determination result, a part management process for the customer company or the company that produces and sells the machine part is performed.

CITATION LIST

Patent Literature

[PTL 1] Japanese Patent No. 4236022

SUMMARY OF INVENTION

Technical Problem

Motion guidance devices for guiding a movable part along its course are used in various apparatuses including robots, machine tools, and semiconductor/liquid crystal manufacturing apparatuses. For example, a linear guide is used as a motion guidance device at locations where a movable part travels in a straight line. With such motion guidance devices, when the various apparatuses are operated, the motion guidance devices used therein are subjected to fluctuating loads. Since such fluctuating loads become cyclic loads with respect to parts constituting the motion guidance devices and may cause a fatigue failure or the like of the parts, fluctuating loads have some impact on the lifespan of the motion guidance devices (in other words, a period in which the motion guidance devices are operable).

When a motion guidance device includes a track member which extends along a longitudinal direction and a moving member which is arranged so as to oppose the track member via a rolling element rollably arranged in a rolling groove and which is relatively movable along the longitudinal direction of the track member, the moving member is to move with respect to the track member in a state of being supported by the rolling element. In such a case, although a cyclic load attributable to a behavior of the rolling element interposed between the moving member and the track member is applied to the moving member, the conventional technique does not give sufficient consideration to this point and is incapable of accurately ascertaining an actual lifespan of the motion guidance device.

For this reason, for both a user of a motion guidance device and a supplier (manufacturer) of the motion guidance device, it is virtually difficult to accurately ascertain a lifespan of the motion guidance device which indicates how long the motion guidance device can be normally used. As a result, operation management by a user of the motion guidance device of various apparatuses using the motion guidance device and manufacturing management of the motion guidance device by a supplier (manufacturer) of the motion guidance device cannot be suitably performed, and the need to secure a relatively large margin with respect to the use of the motion guidance device in order to avoid unforeseen circumstances inevitably creates waste in management for both parties.

The present invention has been made in consideration of the problem described above and an object thereof is to provide a technique which enables both a user of a motion guidance device and a supplier (manufacturer) of the motion guidance device to accurately ascertain an actual lifespan of the motion guidance device and which suppresses, as much as possible, waste related to management of the motion guidance device by both parties.

Solution to Problem

In order to solve the problem described above, the present invention adopts a configuration in which, in order to ascertain a cyclic load which occurs in a motion guidance device and which is related to a lifespan thereof, a sensor for detecting a displacement of a moving member in a prescribed number of displacement directions in the device is arranged in plurality. Using detected values of the sensors, an actual lifespan of the motion guidance device can be accurately calculated and, at the same time, sharing information related to the lifespan between a user of the motion guidance device and a manufacturer of the motion guidance device enables efficiency of management related to the motion guidance device by both parties to be improved.

Specifically, the present invention is a management system which manages user equipment installed in a prescribed space managed by a user, the user equipment including a plurality of motion guidance devices each including: a track member which extends along a longitudinal direction; a moving member which is arranged so as to oppose the track member via a rolling element rollably arranged in a rolling groove and which is relatively movable along the longitudinal direction of the track member; and a plurality of displacement sensors which detect displacements of the moving member in a prescribed number of displacement directions in the moving member. In addition, the management system includes: a reception unit which receives lifespan-related information calculated on the basis of detected values of the plurality of displacement sensors included in each of the plurality of motion guidance devices, the lifespan-related information being related to a lifespan exhaustion ratio of the motion guidance device; a calculation unit which calculates a lifespan exhaustion ratio of each motion guidance device on the basis of the lifespan-related information having been received by the reception unit and corresponding to each of the plurality of motion guidance devices; a determination unit which determines, on the basis of the lifespan exhaustion ratio of each of the plurality of motion guidance devices calculated by the calculation unit, replacement object devices constituting a part of or all of the plurality of motion guidance devices, the replacement object devices being motion guidance devices to be replaced within a prescribed period from a reception timing of the lifespan-related information by the reception unit; and a manufacturing management unit which notifies the user of a replacement timing at which all of the replacement object devices determined by the determination unit in the user equipment are to be replaced.

The management system according to the present invention is a system which manages user equipment including a plurality of motion guidance devices, each motion guidance device including a track member and a moving member and being further provided with a plurality of displacement sensors which detect displacements of the moving member in a prescribed number of displacement directions in the moving member. The plurality of displacement sensors detect, when the moving member performs a relative movement with respect to the track member, how much the moving member has been displaced with respect to the track member in a prescribed number of displacement directions defined so as to enable a cyclic load that acts on the moving member to be calculated. Therefore, the displacement directions detectable by the displacement sensors do not include a movement direction of the moving member itself with respect to the track member.

Detected values output from the plurality of displacement sensors mounted to a motion guidance device as described above are to be used in a calculation process of lifespan-related information. The lifespan-related information is information related to a lifespan exhaustion ratio of the motion guidance device. In this case, the lifespan exhaustion ratio refers to a rate representing how much of a maximum usable period of the motion guidance device has already been used and, for example, a lifespan exhaustion ratio of 100% signifies a state where the maximum usable period has been used up and the motion guidance device can no longer be used. The lifespan-related information may be information including a value of the lifespan exhaustion ratio itself, information which is generated by processing detected values of the displacement sensors and which is necessary for calculating the lifespan exhaustion ratio, or information including detected values of the displacement sensors themselves which enable the lifespan exhaustion ratio to be calculated. In addition, the management system according to the present invention receives, with the reception unit, the lifespan-related information from the plurality of motion guidance devices included in the user equipment.

Furthermore, in the management system according to the present invention, the calculation unit calculates the lifespan exhaustion ratio of each motion guidance device on the basis of the received lifespan-related information. As described above, since the lifespan-related information is based on detected values of the displacement sensors mounted to the motion guidance devices, the lifespan-related information can be described as information reflecting an actual use state of the motion guidance devices. Therefore, the lifespan exhaustion information calculated on the basis of the lifespan-related information strongly reflects an actual lifespan of the motion guidance devices. In addition, the determination unit determines replacement object devices on the basis of the calculated lifespan exhaustion ratios. Since the replacement object devices are motion guidance devices to be replaced before reaching a state where the motion guidance devices are unusable and within a prescribed period in which the motion guidance devices can be replaced without leaving a needlessly long usable period and the replacement object devices are determined using lifespan exhaustion ratios that strongly reflects the actual lifespans, waste in management of the motion guidance devices is less likely to be created. It should be noted that the number of motion guidance devices to become replacement object devices may fluctuate in accordance with the prescribed period.

In addition, in the management system according to the present invention, due to the manufacturing management unit notifying the user of replacement timings of all motion guidance devices having become replacement objects, the user is able to share timings at which all of the replacement object devices among the user's user equipment are to be replaced, which makes it easier for the user to formulate a use plan of the user equipment and realizes efficient management of the motion guidance devices. On the other hand, from the perspective of the management system, since the replacement object devices are determined by the determination unit in consideration of lifespan exhaustion ratios based on actual operating states, a manufacturing plan of the replacement object devices can be formulated more readily and more accurately. Therefore, the management system may be described as providing a management process of motion guidance devices to both the user and the manufacturer of the motion guidance devices. As described above, since the determined replacement object devices are determined so that waste in management is less likely to occur for both the user and the manufacturer, for example, the user can minimize a suspension period of the user equipment for replacing the motion guidance devices and, for example, the manufacturer can provide the user with new motion guidance devices for replacement in a timely manner, which in turn enables the manufacturer to reduce a risk of carrying surplus inventory.

Advantageous Effects of Invention

The present invention enables both a user of a motion guidance device and a supplier (manufacturer) of the motion guidance device to accurately ascertain an actual lifespan of the motion guidance device and suppresses, as much as possible, waste related to management of the motion guidance device by both parties.

BRIEF DESCRIPTION OF DRAWINGS

FIG. 1 is a diagram schematically showing a correlation between a management system according to the present invention and a user manufacturing system under management of a user.

FIG. 2 is a diagram schematically showing a correlation between a motion guidance device and a user-side server included in the user manufacturing system shown in FIG. 1.

FIG. 3 is an external perspective view of a motion guidance device according to the present embodiment.

FIG. 4 is a diagram showing an outline of an internal structure of the motion guidance device according to the present embodiment.

FIG. 5(a) is a front view of a motion guidance device as viewed from a longitudinal direction of a rail, and FIG. 5(b) is an enlarged view of part B.

FIG. 6 is a diagram representing an image of functional units respectively formed in a management server, a motion guidance device, and a user-side server according to the present invention.

FIG. 7 is a diagram showing a flow of processes for forming stress information and frequency information in a motion guidance device.

FIG. 8 is a diagram showing a change in output of sensors when external forces act on a carriage.

FIG. 9 is a diagram showing a portion with which balls in the carriage are in contact.

FIG. 10 is a diagram showing a state of an internal load prior to generation of five displacement components.

FIG. 11 is a diagram showing a state of an internal load after the generation of the five displacement components.

FIG. 12 is a diagram showing a movement of balls when a carriage moves along a rail.

FIG. 13 is a graph with a position of a carriage detected by a linear encoder as an abscissa and a displacement detected by a sensor as an ordinate.

FIG. 14 is a diagram showing an example of virtual segments that divide a rolling surface.

FIG. 15 is a diagram showing an example of count values of maximum shear stresses that repetitively occur on a rolling surface during a movement of a carriage.

FIG. 16 is a diagram showing an example of an S-N curve of a material.

FIG. 17 is a diagram showing a flow of a determination process for determining replacement object devices which is executed by the management system according to the present invention.

FIG. 18 is a diagram showing an exchange of information among a management server, a factory, and a user-side server which is performed by a manufacturing management unit included in the management system according to the present invention.

DESCRIPTION OF EMBODIMENTS

Hereinafter, specific embodiments of the present invention will be described with reference to the drawings. It is to be understood that dimensions, materials, shapes, relative arrangements, and the like of components described in the present embodiments are not intended to limit the technical scope of the present invention to the components described in the embodiments unless otherwise noted.

FIRST PRACTICAL EXAMPLE

FIG. 1 schematically represents a correlation between a manufacturer-side system 40 which manufactures a motion guidance device 1 to be used in user equipment installed in a management space owned by a user and user manufacturing systems 20 and 30 in which the user equipment is arranged and which manufacture a user product intended by the user according to the present invention. The user equipment that is equipment for manufacturing the user product of which a typical example is a machine tool is arranged in the user manufacturing systems 20 and 30 and, specifically, the user manufacturing system 20 includes user equipment 22 and 23 and the user manufacturing system 30 includes user equipment 32, 33, and 34. In the user equipment 22, the motion guidance device 1 for supporting a movable portion is used when constructing the equipment. It should be noted that, in the specification of the present application, when individually expressing a motion guidance device, an alphabetical character for identifying each individual motion guidance device will be described after a reference numeral 1, and when collectively expressing the motion guidance devices, only the reference numeral 1 will be described. Therefore, four motion guidance devices 1a to 1d are used in the user equipment 22 and four motion guidance devices 1e to 1h are used in the user equipment 23. In addition, a plurality of the motion guidance devices 1 are also used in each of the user equipment 32 to 34 included in the user manufacturing system 30. A detailed configuration of the motion guidance device 1 will be described later.

In addition, in the user manufacturing system 20, each of the user equipment 22 and 23 is electrically connected to a user-side server 21 so that information based on detected values of displacement sensors mounted to each motion guidance device 1 used in the user equipment and the like can be transmitted. In a similar manner, in the user manufacturing system 30, each of the user equipment 32 to 34 is electrically connected to a user-side server 31.

Furthermore, the manufacturer-side system 40 includes a management server 41, and the management server 41 is respectively connected to the user-side server 21 of the user manufacturing system 20 and the user-side server 31 of the user manufacturing system 30 so as to be capable of communicating with the user-side servers. Accordingly, the management server 41 is capable of acquiring information related to the motion guidance devices used in the user equipment installed in each user manufacturing system via each user-side server and, at the same time, the management server 41 can notify each user-side server of prescribed information when necessary. In addition, in the manufacturer-side system 40, the management server 41 is also connected to factories 42 which manufacture the motion guidance devices 1 to be supplied to the user so as to be capable of communicating with the factories 42. Accordingly, the management server 41 is capable of issuing an instruction to manufacture the motion guidance devices 1 to each factory 42 and acquiring information related to the manufacture of the motion guidance devices 1 (for example, information on progress of the manufacture and information related to a manufacture completion timing).

A structure of the motion guidance device 1 and a flow of information on the basis of detected values of the displacement sensors mounted to the motion guidance device 1 will now be described with reference to FIGS. 2 to 5. As for the flow of the information, representatively, a flow between the user-side server 21 included in the user manufacturing system 20 and the motion guidance device 1 will be described. In the motion guidance device 1, reference characters 2a to 2d and 3a to 3d denote displacement sensors and a reference character 4 denotes a linear encoder.

First, a configuration of the motion guidance device 1 will be described. The motion guidance device 1 includes a rail 11 (an example of a "track member" as described in the present application) and a carriage 12 (an example of a "moving member" as described in the present application) which is assembled so as to be relatively movable along a longitudinal direction of the rail 11. In the present embodiment, the rail 11 is mounted to a base 7 of the user equipment 22 and a table 8 (refer to FIG. 11) of the user equipment 22 is mounted to the carriage 12. A direction of moment of a movable part including the table 8 is guided by the motion guidance device 1. It should be noted that the motion guidance device 1 can be vertically flipped and have the carriage 12 mounted to the base 7 and the rail 11 mounted to the table 8. In addition, the motion guidance device 1 may be used in a state where the longitudinal direction of the rail 11 is inclined or perpendicular with respect to a horizontal plane instead of being horizontal.

FIG. 3 shows an external perspective view of the motion guidance device 1. For the purpose of illustration, the configuration of the motion guidance device 1 will be described on the assumption that the rail 11 is arranged on a horizontal plane, a direction viewed from the longitudinal direction of the rail 11 or, in other words, an x axis shown in FIG. 3 is a front-back direction, a y axis shown in FIG. 3 is a vertical direction, and a z axis shown in FIG. 3 is a horizontal direction. It is needless to say that an arrangement of the motion guidance device 1 is not limited to this arrangement.

Two (upper and lower) band-like rolling surfaces 11a are provided on each of left and right sides of the rail 11. The rolling surface 11a has an arc-like cross section. Through-holes 11b through which a fastening member for fastening the rail 11 to the base 7 is passed are provided at an appropriate pitch along the longitudinal direction on an upper surface of the rail 11.

The carriage 12 has a U-shaped cross section constituted by a horizontal part 12-1 which opposes the upper surface of the rail 11 and a pair of side parts 12-2 which oppose side surfaces of the rail 11. The carriage 12 includes a carriage main body 13 at center in a movement direction, a pair of lid members 14a and 14b arranged at both ends in a movement direction of the carriage main body 13, and a pair of sensor mounting members 15a and 15b (refer to FIG. 2) arranged at both ends in a movement direction of the pair of lid members 14a and 14b. The lid members 14a and 14b have a U-shaped cross section constituted by a horizontal part 14-1 which opposes the upper surface of the rail 11 and a pair of side parts 14-2 which oppose the side surfaces of the rail 11. The sensor mounting members 15a and 15b similarly have a U-shaped cross section constituted by a horizontal part 15-1 which opposes the upper surface of the rail 11 and a pair of side parts 15-2 which oppose the side surfaces of the rail 11 (refer to FIG. 5(a)). The lid members 14a and 14b are fastened to the carriage main body 13 by fastening members such as bolts. The sensor mounting members 15a and 15b are fastened to the carriage main body 13 and the lid members 14a and 14b by fastening members such as bolts. It should be noted that the sensor mounting members 15a and 15b have been omitted in FIGS. 3 and 4.

FIG. 4 is a diagram showing an outline of an internal structure of the motion guidance device 1. As shown in FIG. 4, the carriage main body 13 is provided with four band-like rolling surfaces 13a which oppose the four band-like rolling surfaces 11a of the rail 11. The carriage main body 13 is provided with a return path 13b which is parallel to each rolling surface 13a. The lid members 14a and 14b are provided with U-shaped turnaround paths 14c which connect each rolling surface 13a and each return path 13b to each other. An inner circumferential side of the turnaround path 14c is constituted by an inner circumferential part 13c which has a hemispherical cross section and which is integrated with the carriage main body 13. A track-like circulatory path is constituted by a load rolling path between the rolling surface 11a of the rail 11 and the rolling surface 13a of the carriage main body 13, the pair of turnaround paths 14c, and the return path 13b. The circulatory path houses a plurality of balls 16 (an example of "rolling elements" as described in the present application). When the carriage 12 relatively moves with respect to the rail 11, the balls 16 interposed between the rail 11 and the carriage 12 roll along the load rolling path. The balls 16 having rolled to one end of the load rolling path is introduced to one of the turnaround paths 14c, advances along the return path 13b and then the other turnaround path 14c, and returns to another end of the load rolling path.

Configuration of Sensor

The displacement sensors 2a to 2d and 3a to 3d are, for example, capacitance type displacement meters and detect a displacement of the carriage 12 with respect to the rail 11 in a contact-less manner (refer to enlarged view of FIG. 5(b)). As shown in FIG. 2, the pair of sensor mounting members 15a and 15b are mounted to both ends of the carriage 12 in the movement direction. Four displacement sensors 2a to 2d are mounted to one sensor mounting member 15a. The four displacement sensors 2a to 2d are arranged at a same position in the longitudinal direction of the rail 11. Four displacement sensors 3a to 3d are similarly mounted to the other sensor mounting member 15b. The four displacement sensors 3a to 3d are arranged at a same position in the longitudinal direction of the rail 11. A distance between the displacement sensors 2a to 2d and the displacement sensors 3a to 3d in the longitudinal direction of the rail 11 is denoted by $L_1$ (refer to FIG. 2). Alternatively, the respective displacement sensors 2a to 2d and 3a to 3d can also be arranged in a staggered manner along the movement direction of the carriage 12.

FIG. 5(a) shows the sensor mounting member 15a as viewed from the longitudinal direction of the rail 11. As described above, the sensor mounting member 15a has the horizontal part 15-1 which opposes an upper surface 11c of the rail 11 and the pair of side parts 15-2 which oppose the left and right side surfaces of the rail 11. Two displacement sensors 2a and 2b which detect a displacement in a radial direction are arranged in the horizontal part 15-1. The displacement sensors 2a and 2b face each other across a gap on the upper surface 11c of the rail 11 and detect a gap to the upper surface 11c of the rail 11. A distance between the two displacement sensors 2a and 2b in the horizontal direction is denoted by $L_2$.

Two displacement sensors 2c and 2d which detect a displacement in the horizontal direction are arranged in the pair of side parts 15-2. The displacement sensors 2c and 2d face each other across a gap on a side surface 11d of the rail 11 and detect a gap to the side surface 11d.

In a state where the rail 11 is assumed to be arranged on a horizontal plane, the displacement sensors 2a and 2b and the displacement sensors 2c and 2d are arranged lower than an upper surface (a mounting surface) of the carriage 12. This arrangement is adopted in order to allow the table 8 to be mounted on the upper surface (the mounting surface) of the carriage 12. Cables $2a_1$ to $2d_1$ of the displacement sensors 2a to 2d are drawn out in the horizontal direction from the side part 15-2 of the sensor mounting member 15a. Alternatively, the cables $2a_1$ to $2d_1$ can be drawn out toward the front (in a direction perpendicular to a paper plane) from a front surface of the sensor mounting member 15a. In addition, a height of an upper surface of the sensor mounting member 15a can be set lower than the upper surface (the mounting surface) of the carriage 12 and a gap between the upper surface of the sensor mounting member 15a and the table 8 can be utilized as a gap for drawing out the cables $2a_1$ and $2b_1$.

In a similar manner to the sensor mounting member 15a, the sensor mounting member 15b shown in FIG. 2 has the horizontal part 15-1 and a pair of the side parts 15-2 and the displacement sensors 3a to 3d are arranged at positions respectively corresponding to the displacement sensors 2a to 2d.

Configuration of Linear Encoder

The linear encoder 4 detects a position of the carriage 12 in an x axis direction. For example, the linear encoder 4 includes a scale which is mounted to the base 7 of the user equipment 22 or the rail 11 and a head which is mounted to the table 8 of the user equipment 22 or the carriage 12 and which reads the scale. It should be noted that position detecting means which detects a position of the carriage 12 on the rail 11 is not limited to a linear encoder. For example, when the table 8 of the user equipment 22 is ball screw-driven, a rotary encoder which detects an angle of a motor for driving a ball screw can be used as the position detecting means.

Configurations of Motion Guidance Device, User-Side Server, and Management Server FIG. 6 shows a functional block diagram of the motion guidance device 1, the user-side server 21, and the management server 41. It should be noted that the management server 41 including the functional units described below means that the management server 41 corresponds to the management system according to the present invention. The motion guidance device 1 includes an arithmetic processing device for processing and a memory for temporarily storing detected values of the displacement sensor 2a and the like, and various functions are exhibited when the arithmetic processing device executes a prescribed control program. In addition, the user-side server 21 and the management server 41 also include an arithmetic processing device, a memory, and the like, and various functions are exhibited when the arithmetic processing device executes a prescribed control program. Furthermore, the functional block diagram shown in FIG. 6 is an image of functions respectively included in the motion guidance device 1, the user-side server 21, and the management server 41, and further represents correlations among the functional units of the respective devices. It should be noted that, while the user-side server 31 basically includes functions similar to those of the user-side server 21, an illustration of the functional units will be omitted.

As functional units, the motion guidance device 1 includes a recording unit 101, a device-side calculation unit 102, and an output unit 103. The recording unit 101 records, in each prescribed sampling period, displacement information of the carriage 12 which are detected values of the displacement sensors 2a to 2d and 3a to 3d. In doing so, the recording unit 101 also records, in each prescribed sampling period, detected values of the linear encoder 4 as positional information of the carriage 12. The displacement sensors 2a to 2d and 3a to 3d detect an amount of displacement of the carriage 12 with respect to the rail 11. The amount of displacement of the carriage 12 with respect to the rail 11 represents a difference from a detected value of the displacement sensors 2a to 2d and 3a to 3d in an unloaded state where no load is applied to the carriage 12. In consideration thereof, the recording unit 101 records, as the amount of displacement of the carriage 12 with respect to the rail 11, a value obtained by subtracting a detected value of the displacement sensors 2a to 2d and 3a to 3d in an unloaded state and stored in advance from the value of the displacement information detected by the displacement sensors 2a to 2d and 3a to 3d.

In addition, the device-side calculation unit 102 is a functional unit which calculates stress information related to a stress during movement that occurs during a movement of the carriage 12 and frequency information related to the number of repetitions of the stress during movement, the stress information and the frequency information being parameters used to calculate a lifespan exhaustion ratio of the motion guidance device 1 to be calculated by the management server 41 as will be described later. In this case, the lifespan exhaustion ratio refers to a rate representing how much of a maximum usable period of the motion guidance device 1 has already been used and, for example, a lifespan exhaustion ratio of 100% signifies a state where the maximum usable period has been used up and the motion guidance device 1 can no longer be used. Furthermore, the stress information and the frequency information are parameters used to calculate the lifespan exhaustion ratio, and details thereof will be provided later. In addition, the output unit 103 is a functional unit which transmits the stress information and the frequency information calculated by the device-side calculation unit 102 to the user-side server 21 to which the motion guidance device 1 is connected. It should be noted that the output unit 103 also transmits history information related to an operation history of the motion guidance device 1 and identification information for identifying the motion guidance device 1 to the user-side server 21. As the history information, the detected value of the linear encoder 4 which is interlocked with a motion of the carriage 12 can be used.

Next, functional units of the user-side server 21 will be described. As functional units, the user-side server 21 includes a reception unit 201, an accumulation unit 202, and a transmission unit 203. The reception unit 201 is a functional unit which receives various kinds of information transmitted from the output unit 103 included in the motion guidance device 1. It should be noted that the reception unit 201 is configured so as to receive the stress information, the frequency information, the history information, and the identification information described above from each motion guidance device 1 used in the user equipment 22 and 23 and to be capable of determining from which motion guidance device 1 the various kinds of received information had been transmitted. In addition, the received stress information and the like are recorded in the user-side server 21 by the accumulation unit 202 while maintaining its correspondence with corresponding identification information. Furthermore, the transmission unit 203 is a functional unit which transmits the stress information and the like accumulated by the accumulation unit 202 to the management server 41 in a state where correspondence of the stress information and the like with corresponding identification information is maintained.

Next, functional units of the management server 41 will be described. As functional units, the management server 41 includes a reception unit 401, a system-side calculation unit 402, a determination unit 403, and a manufacturing management unit 404. The reception unit 401 is a functional unit which receives various kinds of information related to each motion guidance device 1 transmitted from the transmission unit 203 included in the user-side server 21 together with identification information of the motion guidance device 1. In addition, among the information received by the reception unit 401, information related to the lifespan exhaustion ratio of the motion guidance devices 1 such as the stress information, the frequency information, and the like described above which include identification information of each motion guidance device 1 corresponds to lifespan-related information according to the present invention. Furthermore, the system-side calculation unit 402 is a functional unit which calculates, on the basis of the lifespan-related information received by the reception unit 401, the lifespan exhaustion ratio of a corresponding motion guidance device 1. A specific calculation of the lifespan exhaustion ratio will be described later. Next, the determination unit 403 is a functional unit for determining, on the basis of the lifespan exhaustion ratio of each motion guidance device 1 calculated by the system-side calculation unit 402, the motion guidance devices 1 to be objects of replacement in the user equipment 22. The determination unit 403 is a functional unit which is realized when a determination process shown in FIG. 17 is executed, and details thereof will be described later. Next, the manufacturing management unit 404 is a functional unit which issues a notification related to a replacement timing to the user on the basis of a determination result by the determination unit 403. In addition, the manufacturing management unit 404 is a functional unit which also realizes a management process related to manufacture in the factory 42 of the motion guidance devices 1 which are objects of replacement in the manufacturer-side system 40. A flow of processes related to the notification and the manufacturing management by the manufacturing management unit 404 is shown in FIG. 18 and details thereof will be provided later.

Details of Device-Side Calculation Unit 102

Details of contents of processes performed by the device-side calculation unit 102 will now be described with reference to FIGS. 7 to 15. As described above, the device-side calculation unit 102 calculates stress information and frequency information which are lifespan-related information for calculating a lifespan exhaustion ratio of the motion guidance device 1. By configuring the motion guidance device 1 so that the stress information and the frequency information are calculated in the motion guidance device 1 in this manner, the motion guidance device 1 is to bear a part of a load of calculating the lifespan exhaustion ratio of the motion guidance device 1. As a result, an amount of information that is transmitted from the motion guidance device 1 to the management server 41 via the user-side server 21 can be compressed and, at the same time, a load applied to the management server 41 in order to calculate the lifespan exhaustion ratio of the motion guidance device 1 can be reduced.

An outline of a calculation process of the stress information and the frequency information which are lifespan-related information performed by the device-side calculation unit 102 will be described with reference to FIG. 7. The calculation process shown in FIG. 7 is a process that is repetitively executed by the device-side calculation unit 102 at prescribed time intervals. First, during an operation of the user equipment 22 which involves using the motion guidance device 1, the device-side calculation unit 102 acquires an amount of displacement of the carriage 12 from the respective displacement sensors 2a to 2d and 3a to 3d (S101). Subsequently, on the basis of data of the amount of displacement of the carriage 12 acquired in step S101, the device-side calculation unit 102 calculates a load acting on the carriage 12 (S102).

The calculated load is used to calculate stresses that occur in each part of the rolling surface 13a of the carriage main body 13. When calculating the stresses that occur in each part of the rolling surface 13a, the device-side calculation unit 102 first determines whether or not the carriage 12 is moving on the basis of positional information of the carriage 12 detected by the linear encoder 4 (S103).

Examples of phenomena that indicate a lifespan of the motion guidance device 1 include a scale-like detachment (hereinafter, referred to as "flaking") which occurs on the rolling surface 13a. Flaking occurs when shear stresses from the rolling surface 13a being subjected to a load of the balls 16 are repetitively applied to a slightly deeper position than the rolling surface 13a and a material forming the rolling surface 13a becomes fatigued. In this case, conceivably, a repetitive load that accompanies waving during a movement of the carriage 12 is a primary cause of the repetitive occurrences of the shear stresses at a slightly deeper position than the rolling surface 13a. In consideration thereof, when a positive determination is made in step S103, the device-side calculation unit 102 detects a crest of the waving on the basis of the amount of displacement and the positional information of the carriage 12 which are detected by the displacement sensor 2a and the like (S104). On the other hand, when a negative determination is made in S103, the present calculation process is ended. Subsequently, when a crest of the waving is detected in S104, the device-side calculation unit 102 calculates shear stresses that occur in each part of the rolling surface 13a when the carriage 12 is moving on the basis of the load calculated in S102 and performs an addition process of adding a counter value to a counter that counts the number of occurrences of stresses for each magnitude of the stresses and each portion of the rolling surface 13a (S105). The present calculation process ends unless a crest of waving is detected in S104.

As a result of the calculation process described above which includes the series of processes from S101 to S105 being repetitively executed, the number of occurrences of shear stresses that are repetitively applied to each part of the rolling surface 13a of the carriage 12 accompanying waving is aggregated for each magnitude of the stresses and each portion of the rolling surface 13a. Information related to the shear stresses and the number of occurrences calculated by the device-side calculation unit 102 correspond to stress information and frequency information which are lifespan-related information according to the present invention, and the information is transmitted by the output unit 103 to the reception unit 201 included in the user-side server 21 and subsequently further transmitted by the transmission unit 203 to the reception unit 401 included in the management server 41. Due to such a configuration, lifespan-related information is generated inside the motion guidance device 1 from detected values of the displacement sensor 2a and the like and, subsequently, the lifespan-related information is to be aggregated to the management server 41.

Next, details of processes of the respective steps described above will be described.

S101

In S101, during the operation of the user equipment 22 which involves using the motion guidance device 1, the device-side calculation unit 102 acquires an amount of displacement of the carriage 12 from the respective displacement sensors 2a to 2d and 3a to 3d. Since a measured value of the respective displacement sensors 2a to 2d and 3a to 3d is a distance from the sensor to the rolling surface, the device-side calculation unit 102 uses a distance from the sensor to the rolling surface in an unloaded state where no load is applied to the carriage 12 as a reference and acquires a difference from the reference distance as an amount of displacement of the carriage 12.

S102

Next, in S102, the device-side calculation unit 102 calculates a load acting on the carriage 12 on the basis of a displacement of the carriage 12. When calculating the load, the device-side calculation unit 102 first calculates five displacement components of the carriage 12 on the basis of an amount of displacement of the carriage 12 acquired from each of the displacement sensors 2a to 2d and 3a to 3d. Next, on the basis of the five displacement components, the device-side calculation unit 102 calculates a load acting on each of the plurality of balls 16 and a contact angle of each ball 16. Subsequently, on the basis of the load and the contact angle of each ball 16, the device-side calculation unit 102 calculates the load (five external force components) which acts on the carriage 12. Details of the three steps described above will be provided below.

Step 1: Calculation of Five Displacement Components of Carriage

As shown in FIG. 3, when x-y-z coordinate axes are set to the motion guidance device 1, loads that act on a coordinate origin of the x-y-z coordinate axes are $F_y$ denoting a radial load and $F_z$ denoting a horizontal load. The radial load is a load acting in a positive direction of the y axis shown in FIG. 3 which is a direction in which the carriage 12 is pressed against the rail 11. The horizontal load is a load acting in positive and negative directions of the z axis shown in FIG. 3 which are directions in which the carriage 12 is laterally shifted with respect to the rail 11.

In addition, moments around the x-y-z coordinate axes are $M_a$ denoting a sum of pitching moments, $M_b$ denoting a sum of yawing moments, and $M_c$ denoting a sum of rolling moments. The radial load $F_y$, the pitching moment $M_a$, the rolling moment $M_c$, the horizontal load $F_z$, and the yawing moment $M_b$ act on the carriage 12 as external forces. When these five external force components act on the carriage 12, five displacement components respectively corresponding to the five external force components or, more specifically, a radial displacement $\alpha_1$ (mm), a pitch angle $\alpha_2$ (rad), a roll angle $\alpha_3$ (rad), a horizontal displacement $\alpha_4$ (mm), and a yaw angle $\alpha_5$ (rad) are generated on the carriage 12.

FIG. 8 shows a change in outputs of the displacement sensors 2a to 2d when external forces act on the carriage 12. In FIG. 8, arrows with diagonal hatchings indicate sensors of which an output changes and blank arrows indicate sensors of which an output does not change. When the radial load $F_y$ acts on the carriage 12, a gap in the vertical direction between the carriage 12 and the rail 11 changes in accordance with a magnitude of the radial load $F_y$. The displacement sensors 2a and 2b detect a change (a displacement) of the gap in the vertical direction. It should be noted that the displacement sensors 3a and 3b mounted to the sensor mounting member 15b (refer to FIG. 2) also detect a displacement in the vertical direction.

When the radial load $F_y$ acts on the carriage 12, for example, the radial displacement $\alpha_1$ of the carriage 12 is given by the following equation, where $A_1$ and $A_2$ denote displacements detected by the displacement sensors 2a and 2b and $A_3$ and $A_4$ denote displacements detected by the displacement sensors 3a and 3b.

$$\alpha_1 = (A_1 + A_2 + A_3 + A_4)/4 \quad \text{(Math. 1)}$$

When the horizontal load $F_z$ acts on the carriage 12, the carriage 12 shifts laterally with respect to the rail 11, a gap in the horizontal direction between one of the side parts 12-2 of the carriage 12 and the rail 11 decreases, and a gap in the horizontal direction between the other side part 12-2 of the carriage 12 and the rail 11 increases. The displacement sensors 2c and 2d detect such a change (a displacement) of the gap in the horizontal direction. It should be noted that the displacement sensors 3c and 3d mounted to the sensor mounting member 15b (refer to FIG. 2) also detect a displacement in the horizontal direction. The horizontal displacement $\alpha_4$ of the carriage 12 is given by the following equation, where $B_1$ and $B_2$ denote displacements detected by the displacement sensors 2c and 2d and $B_3$ and $B_4$ denote displacements detected by the displacement sensors 3c and 3d.

$$\alpha_4 = (B_1 - B_2 + B_3 - B_4)/4 \quad \text{(Math. 2)}$$

When the pitching moment $M_a$ acts on the carriage 12, gaps between the displacement sensors 2a and 2b and the rail 11 increase and gaps between the displacement sensors 3a and 3b and the rail 11 decrease. Assuming that the pitch angle $\alpha_2$ is sufficiently small, for example, the pitch angle $\alpha_2$ (rad) is given by the following equation.

$$\alpha_2 = ((A_3 + A_4)/2 - (A_1 + A_2)/2)/L_1 \quad \text{(Math. 3)}$$

When the rolling moment $M_c$ acts on the carriage 12, gaps between the displacement sensors 2a and 3a and the rail 11 decrease and gaps between the displacement sensors 2b and 3b and the rail 11 increase. Assuming that the roll angle $\alpha_3$ is sufficiently small, for example, the roll angle $\alpha_3$ (rad) is given by the following equation.

$$\alpha_3 = ((A_1 + A_3)/2 - (A_2 + A_4)/2)/L_2 \quad \text{(Math. 4)}$$

When the yawing moment $M_b$ acts on the carriage 12, gaps between the displacement sensors 2c and 3d and the rail 11 decrease and gaps between the displacement sensors 2d and 3c and the rail 11 increase. Assuming that the yaw angle $\alpha_5$ is sufficiently small, for example, the yaw angle $\alpha_5$ (rad) is given by the following equation.

$$\alpha_5 = ((A_1 + A_4)/2 - (A_2 + A_3)/2)/L_2 \quad \text{(Math. 5)}$$

As described above, the five displacement components of the carriage 12 can be calculated on the basis of displacements detected by the displacement sensors 2a to 2d and 3a to 3d.

Step 2: Calculation of Acting Loads and Contact Angles of Each Ball

FIG. 9 shows a state where a cross section in the x axis direction of a portion with which the balls 16 are in contact inside the carriage 12 has been taken. From FIG. 9, a pitch of the balls is denoted by κDa using κ having a slightly larger value than 1 and an x coordinate of each ball is determined and denoted by $X_i$. $2U_x$ denotes a length of a portion in which the balls 16 roll inside the carriage 12. The number of balls that line up within $2U_x$ is referred to as the number of significant balls and is denoted by I. Curved surface machining with a large R-shape referred to as a crowning process is applied to both end portions of the carriage 12 so as to produce a radius of R and a depth of $\lambda_\varepsilon$.

Theoretical formulas are formed on the assumption that five displacement components or, in other words, the radial displacement $\alpha_1$, the pitch angle $\alpha_2$, the roll angle $\alpha_3$, the horizontal displacement $\alpha_4$, and the yaw angle $\alpha_5$ are generated on the carriage 12 when the five external force components or, in other words, the radial load $F_y$, the pitching moment $M_a$, the rolling moment $M_c$, the horizontal load $F_z$, and the yawing moment $M_b$ act on the carriage 12.

FIG. 10 shows a state of an internal load before the five displacement components are generated and FIG. 11 shows a state of the internal load after the five displacement components are generated of a cross section in the carriage 12 at a ball number i of the carriage 12. In this case, a ball row number in the carriage 12 is denoted by j and a ball number in a ball row is denoted by 1. $D_a$ denotes a ball diameter, f denotes a degree of conformance between the rolling surface and the ball 16 on both the side of the rail 11 and the side of the carriage 12, and, consequently, $fD_a$ denotes a radius of curvature of the rolling surface. In addition, $A_r$ denotes a center of curvature position of the rail-side rolling surface, $A_c$ denotes a center of curvature position of the carriage-side rolling surface, and γ denotes an initial state of a contact angle that is an angle formed between a line connecting $A_r$ and $A_c$ and the z axis. Furthermore, $2U_{z12}$ denotes a ball-center distance between balls 16 which respectively roll on the two rolling surfaces on an upper side of the rail 11, $2U_{z34}$ denotes a ball-center distance between balls 16 which respectively roll on the two rolling surfaces on a lower side of the rail 11, and $2U_y$ denotes a ball-center distance between balls 16 which respectively roll on a rolling surface on the upper side of the rail 11 and a rolling surface on the lower side of the rail 11.

Precompression acts on the balls 16. First, a principle of precompression will be described. Dimensions of a portion sandwiched between opposing rolling surfaces of the rail 11 and the carriage 12 are determined by dimensions of the rail 11 and the carriage 12 at the time of design and by a geometric shape of the rolling surfaces. While a ball diameter that fits into the portion is a ball diameter at the time of design, when a ball 16 with a slightly larger dimension Da+λ than the ball diameter at the time of design is assembled into the portion, according to Hertz's contact theory, the contact portion between the ball 16 and the rolling surface elastically deforms, forms a contact surface, and generates a contact stress. A load generated in this manner is an internal load that is a precompression load.

In FIG. 10, the load is denoted by $P_0$, and an amount of mutual approach between the rail 11 and the carriage 12 due to the elastic deformation of the contact portion is denoted by $δ_0$. Although a ball position is actually at a center position between rolling surfaces of the rail 11 and the carriage 12 depicted by dashed-dotted lines in FIG. 10, since the degrees of conformance f between both rolling surfaces and the ball 16 are equal to each other, various characteristic values on the basis of Hertz's contact theory which are generated at the two contact portions of the ball 16 are the same. Therefore, the ball 16 is depicted by being moved to a position of the rail-side rolling surface in order to make the amount of mutual approach $δ_0$ between the rolling surfaces of the rail 11 and the carriage 12 more readily understandable.

Normally, since the precompression load is defined as a radial direction load of two upper rows (or two lower rows) per one carriage, the precompression load $P_{pre}$ is expressed by the following equation.

$$P_{pre} = 2\sum_{i=1}^{I}\sum_{j=1}^{2} P_{0i} \sin\gamma_j \tag{Math. 6}$$

Next, a state where the five external force components have acted on the motion guidance device 1 from the state described above and the five displacement components have been generated will be described. As shown in FIG. 11, due to the five displacement components including the radial displacement $α_1$, the pitch angle $α_2$, the roll angle $α_3$, the horizontal displacement $α_4$, and the yaw angle $α_5$ at a center of the motion guidance device 1 which is used as the coordinate origin, a relative displacement of the rail 11 and the carriage 12 has occurred at an i-th ball position.

At this point, while the center of curvature of the rail-side rolling surface does not move, since the carriage 12 moves, the center of curvature of the carriage-side rolling surface geometrically moves at each ball position. This situation is expressed as a movement of $A_c$ denoting the center of curvature of the carriage-side rolling surface to $A_c'$. When an amount of movement from $A_c$ to $A_c'$ is considered separately in the y direction and the z direction, an amount of movement in the y direction is denoted by $δ_y$, an amount of movement in the z direction is denoted by $δ_z$, and subsequent suffixes denote an i-th ball and a j-th ball row, the amounts of movement can be expressed as $$δ_{yij} = α_1 + α_2 x_i + α_3 z_{cij},$$

$$δ_{zij} = α_4 + α_5 x_i - α_3 y_{cij}, \tag{Math. 7}$$

where $z_c$ and $y_c$ denote coordinates of a point $A_c$.

Next, since a line connecting centers of curvature of rolling surfaces on the side of the rail 11 and the side of the carriage 12 forms a contact angle that is a normal direction of a ball load, an initial contact angle $γ_j$ changes to $β_{ij}$ and, furthermore, a distance between the centers of curvature of both rolling surfaces changes from an initial distance between $A_r$ and $A_c$ to a distance between $A_r$ and $A_c'$. This change in the distance between the centers of curvature of both rolling surfaces is manifested as an elastic deformation in both contact portions of the ball 16 and, in a similar manner to the description of FIG. 10, an amount of elastic deformation $δ_{ij}$ of the ball 16 is determined by depicting the ball 16 as being shifted to a position of the rail-side rolling surface.

When the distance between $A_r$ and $A_c'$ is similarly considered separately in the y direction and the z direction, the distance in the y direction is denoted by $V_y$, and the distance in the z direction is denoted by $V_z$, the distances can be expressed using $δ_{yij}$ and $δ_{zij}$ described earlier as follows.

$$V_{yij} = (2f-1)D_a \sin\gamma_j + δ_{yij}$$

$$V_{zij} = (2f-1)D_a \cos\gamma_j + δ_{zij}. \tag{Math. 8}$$

Accordingly, the distance between Ar and Ac' is expressed as $$\overline{ArAc'} = (V_{yij}^2 + V_{zij}^2)^{\frac{1}{2}} \tag{Math. 9}$$

and the contact angle $β_{ij}$ is expressed as $$\tan\beta_{ij} = \frac{V_{yij}}{V_{zij}}. \tag{Math. 10}$$

As a result, the amount of elastic deformation $δ_{ij}$ of the ball 16 is expressed as $$δ_{ij} = (V_{yij}^2 + V_{zij}^2)^{\frac{1}{2}} - (2f-1)D_a + λ - λ_{xi}. \tag{Math. 11}$$

In the state shown in FIG. 9 where a cross section in the x axis direction of a portion with which the balls 16 are in contact inside the carriage 12 has been taken, since $A_c'$ being the center of curvature of the rolling surface on the side of the carriage 12 has separated from $A_c$ being the center of curvature of the rail-side rolling surface, the amount of elastic deformation $\delta_{ij}$ of the ball 16 in the machined portion subjected to crowning has decreased by an amount corresponding to the separation. Since the separation can be regarded as equivalent to a case where the ball diameter is reduced accordingly, the amount is denoted by $\lambda_{xi}$ and subtracted in the equation given above.

Using a formula expressing an amount of elastic approach in a case where a rolling element is a ball as derived from Hertz's contact theory, a rolling element load $P_{ij}$ is obtained from the amount of elastic deformation $\delta_{ij}$ by the following equation.

$$P_{ij} = C_b \delta_{ij}^{\frac{3}{2}}, \quad \text{(Math. 12)}$$

where $C_b$ denotes a nonlinear spring constant (N/mm$^{3/2}$) which is given by the following equation.

$$Cb = 2^{-\frac{3}{2}} \left(\frac{2K}{\pi\mu}\right)^{-\frac{3}{2}} \left[\frac{1}{8}\left\{\frac{3}{E}\left(1 - \frac{1}{m^2}\right)\right\}^2 \sum \rho\right]^{-\frac{1}{2}}, \quad \text{(Math. 13)}$$

where E denotes a longitudinal elastic modulus, 1/m denotes Poisson's ratio, $2K/\pi\mu$ denotes the Hertz coefficient, and $\Sigma\rho$ denotes a sum of principal curvatures.

According to the above, the contact angle $\beta_{ij}$, the amount of elastic deformation $\delta_{ij}$, and the rolling element load $P_{ij}$ can be expressed by equations with respect to all of the balls 16 in the carriage 12 using the five displacement components $\alpha_1$ to $\alpha_5$ of the carriage 12.

It should be noted that, in the description given above, a rigid body model load distribution theory in which the carriage 12 is considered a rigid body is used for the sake of brevity. The rigid body model load distribution theory can be expanded and a carriage beam model load distribution theory to which a beam theory has been applied in order to take the deformation of the side part 12-2 of the carriage 12 into consideration can also be used. Furthermore, a carriage-rail FEM model load distribution theory in which the carriage 12 and the rail 11 are considered FEM models can also be used.

Step 3: Calculation of Load (Five External Force Components)

Subsequently, equilibrium condition formulas with respect to the five components as external forces or, in other words, the radial load $F_y$, the pitching moment $M_a$, the rolling moment $M_c$, the horizontal load $F_z$, and the yawing moment $M_b$ need only be set using the equations presented above.

With respect to the radial load $F_y$, $$F_y = \sum_{j=1}^{4} \sum_{i=1}^{I} P_{ij} \sin\beta_{ij} \quad \text{(Math. 14)}$$

With respect to the pitching moment $M_a$, $$M_a = \sum_{j=1}^{4} \sum_{i=1}^{I} P_{ij} \sin\beta_{ij} x_{ij} \quad \text{(Math. 15)}$$

With respect to the rolling moment $M_c$, $$M_c = \sum_{j=1}^{4} \sum_{i=1}^{I} P_{ij} \omega_{ij}, \quad \text{(Math. 16)}$$

where $\omega_{ij}$ denotes a length of a moment arm and is given by the following equation, where $z_r$ and $y_r$ denote coordinates of a point $A_r$.

$$\omega_{ij} = z_{rij} \sin\beta_{ij} - y_{rij} \cos\beta_{ij}$$

With respect to the horizontal load $F_z$, $$F_z = \sum_{j=1}^{4} \sum_{i=1}^{I} P_{ij} \cos\beta_{ij} \quad \text{(Math. 17)}$$

With respect to the yawing moment $M_b$, $$M_b = \sum_{j=1}^{4} \sum_{i=1}^{I} P_{ij} co\beta_{ij} x_i \quad \text{(Math. 18)}$$

Using the equations presented above, the load (the five external force components) acting on the carriage 12 can be calculated.

S103

Next, details of S103 will be described. The device-side calculation unit 102 determines whether or not the carriage 12 is moving. Whether or not the carriage 12 is moving can be determined on the basis of positional information of the carriage 12 which is detected by the linear encoder 4. For example, the device-side calculation unit 102 determines that the carriage 12 is moving when the positional information of the carriage 12 which is detected by the linear encoder 4 changes in a time series but determines that the carriage 12 is stationary when the positional information does not change in a time series.

S104

Next, details of S104 will be described. The device-side calculation unit 102 detects a crest of waving on the basis of the amount of displacement and the positional information of the carriage 12 which are recorded in the recording unit 101.

In this case, waving that occurs with a movement of the carriage 12 refers to an attitude change or a vibration (a pulsation) of the carriage 12 which is caused by a periodic shift in a relative position which occurs between the rolling surface 11a of the rail 11 and the rolling surface 13a of the carriage main body 13 and the balls 16. FIG. 12 is a diagram showing a movement of the balls 16 when the carriage 12 moves along the rail 11. While the carriage 12 includes a plurality of balls 16, the balls 16 which support the carriage 12 among the plurality of balls 16 are the balls 16 (the balls 16 with diagonal hatchings in FIG. 12) which are sandwiched between the rolling surface 11a of the rail 11 and the rolling surface 13a of the carriage main body 13. In addition, as is obvious from a comparison between FIG. 12(A) and FIG. 12(B), the number of balls 16 sandwiched between the rolling surface 11a of the rail 11 and the rolling surface 13a of the carriage main body 13 repetitively increases and decreases with the relative movement of the carriage 12 with respect to the rail 11. The repetition period matches a period in which the carriage 12 moves with respect to the rail 11 by an amount equivalent to a pitch between adjacent balls 16. Therefore, the crest of waving is a crest of a wave that matches a period of a shift in relative positions between the balls 16 which roll when the carriage 12 moves along the rail 11 and the rolling surfaces 11a and 13a among waveforms of displacements which are detected by the displacement sensors 2a to 2d and 3a to 3d.

In consideration thereof, when detecting a crest of waving, the device-side calculation unit 102 first analyzes, for each of the five displacement components, data representing a relationship between a position of the carriage 12 on the rail 11 as obtained from the linear encoder 4 and an amount of displacement of the carriage 12 as obtained from each of the displacement sensors 2a to 2d and 3a to 3d. In addition, the device-side calculation unit 102 determines a presence or absence of data representing waving among the data representing the relationship between the position and the amount of displacement of the carriage 12. With respect to the presence or absence of data representing waving, for example, when visualizing a waveform of a graph having the position of the carriage 12 on the rail 11 as an abscissa and the amount of displacement of the carriage 12 as an ordinate, a determination that waving is present is made when there is a peak that appears at approximately the same period as the pitch of the balls 16 but a determination that waving is absent is made when there is no peak that appears at approximately the same period as the pitch of the balls 16.

FIG. 13 is a graph with a position of the carriage 12 on the rail 11 as detected by the linear encoder 4 as an abscissa and a displacement detected by the displacement sensors 2a to 2d and 3a to 3d as an ordinate. Since the carriage 12 includes the eight displacement sensors 2a to 2d and 3a to 3d and the carriage 12 travels back and forth on the rail 11, under ordinary circumstances, there are a plurality of lines that indicate the relationship between the position and the displacement of the carriage 12. However, in order to facilitate understanding, the graph shown in FIG. 13 indicates the relationship between the position and the displacement of the carriage 12 by one polygonal line. As is apparent from the graph shown in FIG. 13, the displacement of the carriage 12 has two vibration components: a relatively slow displacement and a relatively fine displacement. Among these displacements, the former relatively slow displacement is conceivably, for example, a vibration component other than waving which is attributable to accuracy of the rolling surface 11a of the rail 11 or the like. On the other hand, the latter relatively fine displacement is a vibration component attributable to waving and is a displacement that occurs when the carriage 12 is moving on the rail 11. Intervals on the abscissa between the respective vertexes of the relatively fine displacement indicated in the graph shown in FIG. 13 are more or less consistent with the pitch of the balls 16.

On the basis of data representing the relationship between the position of the carriage 12 on the rail 11 and the amount of displacement of the carriage 12 such as the data represented by the graph shown in FIG. 13, the device-side calculation unit 102 detects a vibration component of fine waving that appears at a period that is more or less the same as the pitch of the balls 16 and detects a crest of the waveform of the vibration component. It should be noted that, as long as waving is detected from data of a displacement detected by any one or more sensors among the plurality of displacement sensors 2a to 2d and 3a to 3d, the device-side calculation unit 102 detects a crest of the waveform of the waving.

S105

When the device-side calculation unit 102 detects a crest of the waveform of waving in S104, the device-side calculation unit 102 calculates maximum shear stresses (an example of "stresses during movement" as described in the present application) which occur on the rolling surface 13a of the carriage 12 on the basis of the load calculated in S102. Information related to the stress during movement corresponds to the stress information as described in the present application. In the present embodiment, in order to ascertain a lifespan due to localized fatigue of the rolling surface 13a, the device-side calculation unit 102 calculates the maximum shear stresses that occur on the rolling surface 13a for each virtual segment defined by dividing the rolling surface 13a along the direction of the track.

FIG. 14 is a diagram showing an example of virtual segments that divide the rolling surface 13a. In the present embodiment, in order to facilitate understanding, a case where the maximum shear stresses are calculated for each virtual segment defined by dividing the rolling surface 13a by the number of significant balls will be described. Shear stresses that occur in each segment of the rolling surface 13a divided in this manner can be calculated in accordance with Hertz's elastic contact theory by a formula created in advance using the rolling element load $P_{ij}$ described earlier with reference to S102 and an analytical model of a strain that occurs in a contact portion between a sphere and a plane.

Next, on the basis of the calculated maximum shear stresses of each segment, the device-side calculation unit 102 counts the number of occurrences of the maximum shear stresses for each magnitude of the stresses. FIG. 15 is a diagram showing an example of count values of the maximum shear stresses that repetitively occur on the rolling surface 13a during a movement of the carriage 12. For example, as shown in FIG. 15, the device-side calculation unit 102 divides step by step the magnitudes of stresses in 50 MPa increments, and adds 1 to a counter value of a division corresponding to the calculated maximum shear stresses for each waving or, in other words, for each timing where a crest occurs in the waveform of the waving shown in FIG. 13. Therefore, the counter value increases in proportion to a cumulative movement distance of the carriage 12. By aggregating the number of occurrences of stresses that cause fatigue of the rolling surface 13a for each magnitude of the stresses and for each segment, for example, even when locally repetitive stresses are occurring in a specific segment of the rolling surface 13a, basic data for a diagnosis which enables a localized fatigue of the rolling surface 13a to be reflected on a lifespan diagnosis of the motion guidance device 1 is obtained.

Details of Management Server 41

As described above, in each motion guidance device 1 included in the user equipment 22, stress information and frequency information are calculated on the basis of a vibration load applied to its own carriage 12 and the pieces of information are transmitted to the management server 41 via the user-side server 21. At this point, in order to enable a determination to be made with respect to stress information and frequency information as to which motion guidance device 1 the pieces of information are associated with, the stress information and the frequency information are transmitted by being associated with identification information of a corresponding motion guidance device 1 and, at the same time, positional information detected by the linear encoder 4 included in each motion guidance device 1 is also transmitted to the management server 41 by being associated with the identification information. In consideration thereof, hereinafter, processes performed in the management server 41 and, particularly, a calculation process of the lifespan exhaustion ratio of each motion guidance device by the system-side calculation unit 402, a determination process of replacement object devices by the determination unit 403, and a management process by the manufacturing management unit 404 respectively included in the management server 41 will be described.

First, the calculation process of the lifespan exhaustion ratio of the motion guidance devices executed by the system-side calculation unit 402 will be described. Using the stress information and the frequency information which are lifespan-related information of each motion guidance device 1 having been transmitted from the transmission unit 203 of the user-side server 21 to the reception unit 401, the system-side calculation unit 402 calculates the lifespan exhaustion ratio of the motion guidance device 1. The lifespan exhaustion ratio is calculated for each segment of the rolling surface 13a. In addition, a value of a highest lifespan exhaustion ratio among the calculated lifespan exhaustion ratios of all segments is adopted as a representative lifespan exhaustion ratio with respect to the motion guidance device 1. The lifespan exhaustion ratios are calculated using, for example, a linear cumulative damage rule. FIG. 16 is a diagram showing an example of an S-N curve of a material. Since the linear cumulative damage rule is used for predicting a lifespan until damage is sustained by a material due to fatigue of the material when an object is repetitively subjected to stresses, the linear cumulative damage rule is effective in ascertaining fatigue of a material due to waving that occurs when the carriage 12 is moving. According to the linear cumulative damage rule, when the number of repetitive breakage with respect to specific repetitive stresses in the S-N curve of a material to be an object is denoted by $L_i$ and the number of actual repetitions to the material is noted by $n_i$, a lifespan exhaustion ratio D is given by the following equation.

$$\sum_{i=1}^{I} \frac{n_i}{L_i} = D \qquad \text{(Math. 19)}$$

In this manner, since the system-side calculation unit 402 uses stress information and frequency information which are lifespan-related information to calculate the lifespan exhaustion ratio of the motion guidance devices 1 in consideration of waving that correlates with repetitive stresses exerted by the balls 16 on the rolling surface 13a of the carriage 12, a calculation result with significantly higher accuracy is obtained as compared to a case where the lifespan exhaustion ratio is calculated without using these pieces of information. In addition, in the motion guidance device 1, since the device-side calculation unit 102 calculates the stress information and the frequency information which are lifespan-related information using detected values of the displacement sensors 2a and the like, a device configuration for calculating the lifespan exhaustion ratio of the motion guidance devices 1 can be made relatively simple. Furthermore, since the system-side calculation unit 402 described above calculates stresses for each of virtual segments defined by dividing the rolling surface 13a of the carriage 12 along a direction of the track, a diagnosis result with higher accuracy can be obtained in comparison to a lifespan diagnosis on the basis of stresses of the entire rolling surface 13a.

Next, the determination process of replacement object devices by the determination unit 403 will be described. A replacement object device refers to a motion guidance device of which the lifespan exhaustion ratio is close to 100% and a replacement by a new motion guidance device is conceivably preferable in order to suitably operate the user equipment 22 among all of the motion guidance devices 1 used in the user equipment 22. It should be noted that, in order to replace the motion guidance devices 1 in the user equipment 22, the operation of the user equipment 22 must be temporarily suspended and, during the suspension period, user products cannot be manufactured by the user equipment 22. Therefore, the suspension period of the user equipment 22 in order to replace the motion guidance devices 1 is preferably as short as possible. In addition, when suspending the user equipment 22 in order to replace the motion guidance devices 1, since a certain amount of time including a preparation period for replacement tends to be required by the replacement, a certain number of motion guidance devices 1 are preferably replaced at the same time. This is because replacing the motion guidance devices 1 on an individual basis necessitates suspending the user equipment 22 for every motion guidance device 1 to be replaced and, as a result, an operating rate of the user equipment 22 declines and manufacturing efficiency of the user product also declines.

In consideration thereof, in the management server 41 according to the present invention, the determination process of replacement object devices that are motion guidance devices 1 to be replaced is performed by the determination unit 403 so that replacement by new motion guidance devices is performed in a suitable manner before the lifespan of the motion guidance devices 1 reaches 100% and, at the same time, the suspension period of the user equipment 22 during the replacement is minimized to prevent the operating rate of the user equipment 22 from declining and to enable the motion guidance devices 1 to be replaced in an efficient manner. Specifically, the determination unit 403 performs a determination process shown in FIG. 17. It should be noted that the determination process may be performed in synchronization with the calculation process of lifespan exhaustion ratios by the system-side calculation unit 402 or may be repetitively performed at prescribed timings regardless of the calculation process. In addition, the determination process is a process that is performed with respect to each user equipment shown in FIG. 1.

First, in S301, a determination is made as to whether or not a replacement flag is "0". The replacement flag is a control flag set with respect to user equipment that is an object of the determination process (in the present practical example, the following description will be given on the assumption that the user equipment that is an object is the user equipment 22), and a replacement flag of "0" signifies a state where replacement object devices in the user equipment 22 have not been determined while a replacement flag of "1" signifies a state where replacement object devices in the user equipment 22 have been determined. The replacement flag is set to "0" when the replacement object devices are determined and replacement of the replacement object devices by the user has been completed in S311 as will be described later. Therefore, in the determination process executed immediately after completion of the replacement, the replacement flag is set to "0". When a positive determination is made in S301, the present determination process advances to S302, but when a negative determination is made in S301, the present determination process ends.

In S302, the lifespan exhaustion ratio, calculated by the system-side calculation unit 402, of each of the four motion guidance devices 1a to 1d used in the user equipment 22 is acquired. Next, in S303, history information related to movements of each of the motion guidance devices 1a to 1d is acquired. Specifically, a time transition of positional information of the linear encoder 4 included in each of the motion guidance devices 1a to 1d is acquired. The positional information is first accumulated in the accumulation unit 202 of the user-side server 21 from the output unit 103 of each of the motion guidance devices 1a to 1d and subsequently transmitted by the transmission unit 203 to the reception unit 401 of the management server 41. Once the process of S303 is finished, the present determination process advances to S304.

In S304, on the basis of the lifespan exhaustion ratios acquired in S302, devices of which the lifespan exhaustion ratio is 90% or higher among the four motion guidance devices 1a to 1d used in the user equipment 22 are extracted as replacement object devices. Subsequently, in S305, a remaining lifespan of the replacement object devices extracted in S304 is calculated. A remaining lifespan refers to a period that remains until the lifespan exhaustion ratio of a replacement object device reaches 100%. Specifically, using an elapsed time $T_{int}$ from the start of use of the linear encoder 4 to a time of calculation of the current lifespan exhaustion ratio D as calculated from the history information described above, a remaining lifespan of a replacement object device can be expressed by the following equation.

$$\text{Remaining lifespan} = (1-D)/D * T_{int}$$

In addition, in S306, a remaining lifespan of the replacement object device with a shortest remaining lifespan among the extracted replacement object devices is specified as Lmin.

Next, in S307, an estimated time (an estimated manufacturing time) Tx required to manufacture the replacement object devices is calculated. When calculating the estimated manufacturing time Tx, the management server 41 includes a map in which a basic time required for manufacture is associated with each type of the motion guidance devices 1, and a basic value of the estimated manufacturing time Tx is calculated by accessing the map. Furthermore, a degree of actual congestion of a corresponding manufacturing line of the motion guidance devices 1 in the factory 42 is taken into consideration with respect to the basic value to calculate a final estimated manufacturing time Tx. When manufacturing motion guidance devices 1 of a plurality of types, if the motion guidance devices 1 can be manufactured simultaneously in parallel, the simultaneous parallel manufacture is taken into consideration when calculating the final estimated manufacturing time Tx. Once the process of S307 is finished, the present determination process advances to S308.

In S308, an estimated time (an estimated replacement time) Ty required to replace the replacement object devices in the user equipment 22 is calculated. When calculating the estimated replacement time Ty, the management server 41 includes a map which associates a basic time required for replacing each of the motion guidance devices 1 in the user equipment 22, and a basic value of the estimated replacement time Ty is calculated by accessing the map. When replacing the motion guidance devices 1, since times required for replacing motion guidance devices may differ if portions where the motion guidance devices are being used inside the equipment differ even when the motion guidance devices are of a same time, as a general rule, a basic value of the estimated replacement time Ty is set in the map for each location where the motion guidance devices are being used in the user equipment. In addition, when a plurality of motion guidance devices are to be replaced at the same time, since efficient replacement is realized as compared to a case where the motion guidance devices are replaced at staggered timings, in consideration of a degree of an improvement in efficiency, the basic value of the estimated replacement time Ty is corrected so as to reduce the estimated replacement time Ty. Once the process of S308 is finished, the present determination process advances to S309.

In S309, a threshold L0 to be used in a determination process of S309 is corrected on the basis of the estimated manufacturing time Tx calculated in S307 and the estimated replacement time Ty calculated in S308. The threshold L0 is a threshold for determining, on the basis of the shortest remaining lifespan Lmin specified in S306, a timing for determining the motion guidance devices 1 to be replaced at a same timing in the user equipment 22. For example, the threshold L0 is corrected so that, while maintaining a state where the shortest remaining lifespan Lmin is longer than the estimated manufacturing time Tx, the estimated replacement time Ty fits within a permissible period required to replace the motion guidance devices which is set in advance with respect to the user equipment 22 and, at the same time, as many motion guidance devices 1 as possible can be replaced at a same timing. Setting such conditions related to replacement enables the motion guidance devices 1 to be operational as long as possible in the user equipment 22 and, at the same time, the time required for replacing the motion guidance devices 1 can be reduced. In this manner, the threshold L0 is a parameter for determining replacement object devices to be replaced within the prescribed period according to the present application. Once the process of S309 is finished, the present determination process advances to S310.

In S310, a determination is made as to whether or not the shortest remaining lifespan Lmin specified in S306 is shorter than the threshold L0 corrected in S309. In consideration of the manufacture of replacement object devices and the replacement of the replacement object devices in the user equipment 22, a positive determination in S310 means that a time limit for determining the replacement object devices has arrived. Therefore, when a positive determination is made in S310, in S311, a determination is finalized as to which motion guidance devices among the motion guidance devices 1a to 1d used in the user equipment 22 are replacement object devices and, in S312, the replacement flag is set to "1" and the present determination process is ended. On the other hand, when a negative determination is made in S310, the replacement flag is unchanged from "0" in S313 and the present determination process is ended. It should be noted that, while the replacement flag is being set to "1", the replacement object devices having been finalized in the determination process of S301 are not changed even when the determination process is repetitively performed.

Next, the management process performed by the manufacturing management unit 404 will be described with reference to FIG. 18. The exchange of information among the management server 41, the factory 42, and the user-side server 21 shown in FIG. 18 represents a case where the replacement flag has been set to "1" by the determination process shown in FIG. 18. When the replacement flag is set to "1" in the management server 41, the manufacturing management unit 404 transmits an instruction to manufacture the motion guidance devices that are replacement object devices to the factory 42. At the factory 42 having received the manufacture instruction, the manufacture of motion guidance devices that are replacement object devices is to be started. During the manufacture at the factory 42, the management server 41 notifies the user-side server 21 of a replacement timing of the motion guidance devices currently being manufactured. For example, a timing obtained by adding the estimated manufacturing time Tx to a timing at which the manufacture instruction had been transmitted to the factory 42 can be notified as the replacement timing. As an alternative method, at a timing where the shortest remaining lifespan Lmin reaches a prescribed time set in advance, the user-side server 21 may be notified of the remaining lifespan Lmin at that timing from the management server 41. Accordingly, the user can ascertain that the motion guidance devices 1 being used in the user equipment 22 owned by the user are in a state where the motion guidance devices 1 should be replaced in the near future and, on the basis of the notification, the user can prepare for the replacement in the user equipment 22.

In addition, in the manufacturing process of the replacement object devices at the factory 42, when a scheduled manufacture completion date estimated by the factory 42 after the user-side server 21 is notified of the replacement timing as described above exceeds a notified scheduled replacement date, a notification is made to the management server 41 from the factory 42 and, at the same time, the management server 41 having received the notification issues a manufacture instruction to the factory 42 so as to prioritize the manufacture of the replacement object devices at the factory 42. In particular, at the factory 42, the motion guidance devices 1 used in the other user equipment 23 and 32 to 34 are being manufactured in addition to those used in the user equipment 22. Therefore, when issuing the prioritized manufacture instruction described above, the manufacture instruction is created so that an effect on motion guidance devices intended for other user equipment is minimized or the manufacture of the motion guidance devices intended for other user equipment fits within an allowable range of manufacture delay set in advance.

A period required to manufacture the motion guidance devices that are replacement object device at the factory 42 is denoted by tx in FIG. 18, and once the manufacture is completed, a completion notification thereof is transmitted from the factory 42 to the management server 41. When the actual manufacturing period tx differs from the estimated manufacturing time Tx, information related to the difference is recorded in the management server 41 and used to improve accuracy of subsequent calculation processes of an estimated manufacturing time in S307.

When the management server 41 receives the manufacture completion notification from the factory 42, the management server 41 transmits a notification related to shipping of the manufactured motion guidance devices to the user-side server 21. Subsequently, the user-side server 21 issues an equipment suspension instruction for suspending the operation of the user equipment 22 to the user equipment 22 and, accordingly, replacement work of the motion guidance devices 1 which are replacement objects is to be performed in the user equipment 22. Once the replacement work is finished, a notification for informing completion of the replacement is transmitted from the user-side server 21 to the management server 41. At the management server 41 having received the replacement completion notification, the notification acts as a trigger to change the replacement flag for the determination process shown in FIG. 17 (the determination process corresponding to the user equipment 22) from "1" to "0".

In the present practical example, as described above, using detected values of displacement sensors mounted to each motion guidance device 1 enables the lifespan exhaustion ratio of the motion guidance device 1 to be ascertained in an extremely accurate manner and in real-time. Therefore, the determination of replacement object devices on the basis of the lifespan exhaustion ratios as well as manufacturing management and user notification on the basis of the determination are extremely accurate in terms of timing. As a result, for a manufacturer of the motion guidance devices, since the motion guidance devices 1 can be manufactured and supplied at timings required by the user, demands of the user can be met in an appropriate manner without the need to carry surplus inventory. In addition, for the user using the motion guidance devices 1, since the motion guidance devices 1 can be used until near the end of their lifespans without waste in the user's own user equipment 22, wasteful replacements of the motion guidance devices 1 can be avoided and, at the same time, since replacements are performed collectively as much as possible, the time required for the replacements can be reduced and a suspension time of the user equipment 22 can be shortened.

Modifications

In the practical example described above, in the motion guidance device 1, stress information and frequency information are calculated as lifespan-related information by the device-side calculation unit 102 and, in the management server 41 having acquired the lifespan-related information, a lifespan exhaustion ratio of the motion guidance device 1 is calculated by the system-side calculation unit 402. In place of the mode described above, in the motion guidance device 1, in addition to the device-side calculation unit 102 calculating stress information and frequency information, the lifespan exhaustion ratio of the motion guidance device 1 itself may also be calculated by the device-side calculation unit 102 on the basis of the stress information and the frequency information. In this case, information related to the calculated lifespan exhaustion ratio and identification information of the motion guidance device 1 collectively correspond to the prescribed generated information according to the present invention, and the prescribed generated information is transmitted to the management server 41 via the user-side server 21. At this point, the system-side calculation unit 402 of the management server 41 is to acquire the transmitted prescribed generated information as information of a lifespan exhaustion ratio.

REFERENCE SIGNS LIST

1 Motion guidance device
2*a*, 2*b*, 2*c*, 2*d*, 3*a*, 3*b*, 3*c*, 3*d* Sensor
4 Linear encoder
5 Data logger
6 Computer
11 Rail
12 Carriage
15*a*, 15*b* Sensor mounting member
15-1 Horizontal part
15-2 Side part
16 Ball
20, 30 User manufacturing system
21, 31 User-side server 22, 23, 32, 33, 34 User equipment
40 Management system
41 Management server
42 Factory

The invention claimed is:

1. A management system which manages user equipment installed in a prescribed space managed by a user, the user equipment including a plurality of motion guidance devices each including: a track member which extends along a longitudinal direction; a moving member which is arranged so as to oppose the track member via a rolling element rollably arranged in a rolling groove and which is relatively movable along the longitudinal direction of the track member; and a plurality of displacement sensors which detect displacements of the moving member in a prescribed number of displacement directions in the moving member, wherein the management system comprises:

a reception unit which receives lifespan-related information calculated on the basis of detected values of the plurality of displacement sensors included in each of the plurality of motion guidance devices, the lifespan-related information being related to a lifespan exhaustion ratio of the motion guidance device;

a calculation unit which calculates a lifespan exhaustion ratio of each motion guidance device on the basis of the lifespan-related information having been received by the reception unit and corresponding to each of the plurality of motion guidance devices;

a determination unit which determines, on the basis of the lifespan exhaustion ratio of each of the plurality of motion guidance devices calculated by the calculation unit, replacement object devices constituting a part of or all of the plurality of motion guidance devices, the replacement object devices being motion guidance devices to be replaced within a prescribed period; and a manufacturing management unit which notifies the user of a replacement timing at which all of the replacement object devices determined by the determination unit in the user equipment are to be replaced.

2. The management system according to claim 1, wherein the manufacturing management unit further manages all manufacturing processes of the replacement object devices so that manufacture of all of the replacement object devices can be completed until a replacement timing at which all of the replacement object devices become replaceable.

3. The management system according to claim 1, wherein the reception unit further receives history information related to an operation history of each of the plurality of motion guidance devices in the user equipment, and the manufacturing management unit notifies the user of a timing at which a remaining operable time of a prescribed replacement object device among all of the replacement object devices reaches a prescribed time as the replacement timing on the basis of the history information and the lifespan exhaustion ratio of the replacement object device.

4. The management system according to claim 1, wherein the lifespan-related information includes, in each of the plurality of motion guidance devices, stress information related to a stress during movement that occurs during a movement of the moving member in the motion guidance device and frequency information related to the number of repetitions of the stress during the movement which are calculated from detected values of the plurality of displacement sensors, and identification information of the motion guidance device, and the calculation unit updates, with respect to one motion guidance device corresponding to the identification information among the plurality of motion guidance devices, the lifespan exhaustion ratio of the one motion guidance device in accordance with a reception of the stress information and the frequency information corresponding to the identification information by the reception unit.

5. The management system according to claim 4, wherein the stress information is information related to the stress during movement that occurs in each of virtual segments defined by dividing a rolling surface of the moving member along a direction of the track during the movement of the moving member, the stress during movement being calculated on the basis of detected values of the plurality of displacement sensors, the frequency information is information related to the number of occurrences of the stress during movement that repetitively occurs with waving during the movement of the moving member along the track; and the calculation unit calculates, for each of the segments, a lifespan exhaustion ratio of the one motion guidance device on the basis of the stress information and the frequency information.

6. The management system according to claim 5, wherein the calculation unit calculates the lifespan exhaustion ratio for each segment on the basis of data of a table in which the number of occurrences of the stresses during movement for each magnitude is aggregated for each segment.

7. The management system according to claim 1, wherein the lifespan-related information includes, in each of the plurality of motion guidance devices, prescribed generated information that is information indicating a lifespan exhaustion ratio of each motion guidance device, the prescribed generated information being generated from at least stress information related to a stress during movement that occurs during a movement of the moving member in each motion guidance device and frequency information related to the number of repetitions of the stress during movement which are calculated from detected values of the plurality of displacement sensors, and identification information of each motion guidance device, and the calculation unit acquires, with respect to one motion guidance device corresponding to the identification information among the plurality of motion guidance devices, the prescribed generated information as the lifespan exhaustion ratio of the one motion guidance device in accordance with a reception of the prescribed generated information corresponding to the identification information by the reception unit.

8. A motion guidance device comprising a track member which extends along a longitudinal direction and a moving member which is arranged so as to oppose the track member via a rolling element rollably arranged in a rolling groove and which is relatively movable along the longitudinal direction of the track member, the motion guidance device further comprising:

a plurality of displacement sensors which detect displacements of the moving member in a prescribed number of displacement directions in the moving member;

a calculation unit which calculates, on the basis of detected values of the plurality of displacement sensors, stress information related to a stress during movement that occurs during a movement of the moving member in the motion guidance device and frequency information related to the number of repetitions of the stress during movement; and an output unit which generates and outputs lifespan-related information related to a lifespan exhaustion ratio of the motion guidance device on the basis of the stress information and the frequency information, the lifespan-related information being to be used in a calculation process of a lifespan exhaustion ratio of the motion guidance device by an external information processing apparatus, and the calculated lifespan exhaustion ratio being to be further used in a determination process for determining a timing of replacement work of the motion guidance device by the external information processing apparatus.

* * * * *